(12) United States Patent
Murahashi et al.

(10) Patent No.: US 8,145,384 B2
(45) Date of Patent: Mar. 27, 2012

(54) LUBRICATING OIL COOLING DEVICE FOR TRAVELING SPEED REDUCTION GEAR

(75) Inventors: Takayoshi Murahashi, Tsuchiura (JP); Osamu Murakami, Kasama (JP); Kenji Itoh, Tsukuba (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 315 days.

(21) Appl. No.: 12/615,545

(22) Filed: Nov. 10, 2009

(65) Prior Publication Data
US 2010/0187043 A1 Jul. 29, 2010

(30) Foreign Application Priority Data

Jan. 28, 2009 (JP) ................................ 2009-016241

(51) Int. Cl.
*B60K 17/14* (2006.01)
*B60K 11/02* (2006.01)

(52) U.S. Cl. ............. 701/36; 701/50; 184/26; 180/65.6; 180/339

(58) Field of Classification Search ............. 701/36, 701/50; 180/339, 65.6, 65.7; 192/113.3, 192/70.12; 184/26; 74/607
See application file for complete search history.

(56) References Cited

U.S. PATENT DOCUMENTS

| | | | | |
|---|---|---|---|---|
| 3,770,074 A | * | 11/1973 | Sherman | 180/65.6 |
| 2008/0296121 A1 | * | 12/2008 | Miyazaki et al. | 192/113.3 |
| 2010/0187042 A1 | * | 7/2010 | Murahashi et al. | 184/6.3 |
| 2010/0187043 A1 | * | 7/2010 | Murahashi et al. | 184/6.3 |
| 2010/0187044 A1 | * | 7/2010 | Nabeshima et al. | 184/26 |
| 2010/0191417 A1 | * | 7/2010 | Murahashi et al. | 701/36 |

FOREIGN PATENT DOCUMENTS

| JP | 62-221918 A | 9/1987 |
|---|---|---|
| JP | 2006-264394 A | 10/2006 |

* cited by examiner

*Primary Examiner* — Ruth Ilan
(74) *Attorney, Agent, or Firm* — Mattingly & Malur, PC

(57) ABSTRACT

The present invention provides a traveling speed reduction gear lubricating oil cooling device that enables optimal temperature control for lubricating oil delivered via a lubricating oil pump that can be started up with a relatively small motor without running the risk of damage to an oil cooler in a cold work environment even when a temperature sensor that detects the temperature of the lubricating oil is installed outside a wheel mounting sleeve. During a startup operation, provided that the detected temperature at a traveling motor is higher than the reference temperature, the lubricating oil pump is driven at a speed in a lower speed range relative to the normal operation speed range. In addition, during the startup operation, the rotation speed of the drive motor for the lubricating oil pump is increased in correspondence to a rise in the temperature detected by a lubricating oil temperature detection sensor.

9 Claims, 20 Drawing Sheets

LUBRICATING OIL COOLING DEVICE FOR TRAVELING SPEED REDUCTION GEAR

TECHNICAL FIELD

The present invention relates to a traveling speed reduction gear lubricating oil cooling device ideal for work vehicles such as large dump trucks used to carry, for instance, crushed rock excavated from mines or the like, and more specifically, it relates to a device that activates a lubricating oil cooling device at an initial startup.

BACKGROUND ART

A dump truck is a type of carrier vehicle that is normally equipped with a body disposed on the truck frame. The body, which can hold a heavy load, such as crushed rock, can be tilted in order to dump its contents. A traveling drive device that drives the drive wheels of the dump truck includes a tubular motor housing sleeve attached to the chassis and a drive motor such as an electric motor or a hydraulic motor that is disposed inside the motor housing sleeve and rotationally drives a rotating shaft. In addition, a tubular spindle is disposed toward the front end of the motor housing sleeve with a wheel mounting sleeve rotatably mounted via a bearing at the outer circumference of the tubular spindle. Wheels are fixed onto the exterior of the wheel mounting sleeves. A traveling speed reduction gear unit that slows down the rotation of the drive motor and transmits the slowed rotational force to the wheel mounting sleeve (wheels) and the like are disposed inside the wheel mounting sleeve (see, for instance, Japanese Laid Open Patent Publication No. S62-221918 and Japanese Laid Open Patent Publication No. 2006-264394).

Lubricating oil used to keep the various gears and the like constituting the reduction gear mechanism in a lubricated state is collected inside the wheel mounting sleeve. As the vehicle travels, the temperature of the lubricating oil rises and the viscosity of the lubricating oil is reduced, resulting in a lower level of lubrication performance. In order to sustain the required level of lubrication performance and prevent degradation of the lubricating oil, an oil cooler is installed in the circulation path. The lubricating oil is circulated via a lubricating oil pump disposed outside the wheel mounting sleeve so that the lubricating oil, forced to circulate via the circulation path into and out of the wheel mounting sleeve, is cooled at the oil cooler.

An intake piping is connected to the intake side of the lubricating oil pump and the intake piping is inserted through the wheel mounting sleeve. An intake port of the intake piping, positioned so as to face toward the bottom surface of the wheel mounting sleeve, extends to a position at which it is immersed under the surface of the lubricating oil in the wheel mounting sleeve. A supply piping is connected to the outlet side of the lubricating oil pump. This supply piping, too, is inserted through the wheel mounting sleeve so as to supply the lubricating oil from the lubricating oil pump into the wheel mounting sleeve.

DISCLOSURE OF THE INVENTION

In the traveling drive device for a work vehicle such as a large dump truck in the related art, the reduction gear lubricating oil, having become heated during a sustained traveling operation needs to be cooled, as described above. Accordingly, a lubricating oil pump and an oil cooler are disposed within the motor housing sleeve housing the traveling motor. The lubricating oil pump draws out the lubricating oil from the wheel mounting sleeve via the circulation path, the lubricating oil having been output through the lubricating oil pump is cooled at the oil cooler and the lubricating oil is then allowed to flow back into the wheel mounting sleeve.

Such a lubricating oil cooling device must be equipped with a temperature sensor that detects a rise in the lubricating oil temperature. The temperature sensor may be installed within the wheel mounting sleeve so as to directly detect the lubricating oil temperature and thus detect the level of actual lubrication function it provides for the reduction gear unit. However, if the temperature sensor installed in the wheel mounting sleeve for direct lubricating oil temperature detection malfunctions, the temperature sensor will have to be removed by disengaging the wheels from the wheel mounting sleeve and also removing the traveling motor from the wheel mounting sleeve. Since the wheels of the large work vehicle are heavy and large, measuring up to, for instance, 4 m in diameter, the replacement process is bound to be a costly process, requiring a significant length of time and significant labor. In addition, since the work vehicle is idle while the temperature sensor is being replaced, the overall economic loss will be considerable.

For these reasons, it is not feasible to install the temperature sensor in the wheel mounting sleeve and, as an alternative, the temperature sensor may be installed in the lubricating oil circulation path outside the wheel mounting sleeve. However, the following issues must be addressed when the work vehicle with the temperature sensor installed outside the wheel mounting sleeve is used in a low temperature environment, e.g., at high elevation locations with altitude of 4000 m or higher, in regions with cold climate, or during winter in regions with relatively high latitudes. Namely, as the work vehicle travels and the temperature of the lubricating oil within the wheel mounting sleeve where the lubricating oil is actually used to lubricate the reduction gears and the like rises, the temperature sensor installed outside the wheel mounting sleeve detects a relatively low temperature close to the temperature of the surrounding environment instead of the temperature of the lubricating oil at the site of lubrication.

The lubricating oil pump in the device in the related art is designed on the premise that it is engaged in operation to circulate the lubricating oil into and out of the wheel mounting sleeve only when the lubricating oil temperature has risen to a level equal to or above, for instance, 70° C. and the lubricating oil is made to travel through the oil cooler so as to be cooled during the circulation process. As described earlier, even when the temperature of the lubricating oil inside the wheel mounting sleeve has risen significantly, the temperature sensor installed outside the wheel mounting sleeve will detect a lower temperature corresponding to the ambient temperature instead of the lubricating oil temperature inside the wheel mounting sleeve. In other words, even as the lubricating oil inside the wheel mounting sleeve is heated to a level that requires cooling, the temperature detected by the temperature sensor installed outside the wheel mounting sleeve may not detect the temperature increase and, as a result, the heated lubricating oil may be allowed to overheat. As the lubricating oil inside the wheel mounting sleeve remains overheated, the lowered viscosity will compromise its lubrication performance and the quality of the lubricating oil will be degraded.

As a means for detecting a temperature close to the temperature of the lubricating oil inside the wheel mounting sleeve by addressing the issues described above arising when the temperature sensor is installed in the circulation path outside the wheel mounting sleeve, the lubricating oil pump may be caused to rotate even when the temperature detected by the temperature sensor is low, so as to draw the lubricating oil in the wheel mounting sleeve to the outside of the wheel mounting sleeve.

However, the lubricating oil with high viscosity, e.g., #90 or #140 is typically used in large work vehicles in which large loads are applied to the gears in the reduction gear unit, in order to withstand such large loads. The high viscosity lubricating oil assumes low fluidity at low temperature, equivalent to that of honey or somewhere between the fluidity of honey and that of starch syrup. This means that in a cold environment where the temperature may go down to −20° C. or lower, the load on the lubricating oil pump becomes exceedingly large and, under such circumstances, the lubricating oil pump can no longer rotate at the rated rotation rate. Even if the lubricating oil pump manages to rotate, the excessive fluid resistance of the lubricating oil may set the lubricating oil pump, driven by an electric motor under inverter control, into an OFF state due to an inverter error.

Under these circumstances, the lubricating oil pump may be started up by using a large-capacity electric motor as the drive motor for the lubricating oil pump. However, the use of such a large capacity electric motor is not feasible in practical application, since it will greatly lower the energy efficiency. There is an added concern that the use of a large capacity electric motor would subject the oil cooler to an excessively large load.

An object of the present invention, having been completed by addressing the issues discussed above, is to provide a traveling speed reduction gear lubricating oil cooling device that allows the lubricating oil temperature sensor to be installed outside the wheel mounting sleeve without inducing damage and the like to the oil cooler even when the work vehicle is engaged in operation in a cold work environment that allows the lubricating oil pump to be started up with a relatively small motor and enables desirable temperature control for the lubricating oil.

The present invention provides a traveling speed reduction gear lubricating oil cooling device in a work vehicle that includes:

tubular wheel mounting sleeves that rotate as one with the wheels of the work vehicle;

traveling motors used to drive the wheel mounting sleeves;

a reduction gear unit housed inside each wheel mounting sleeve and constituted with a gear mechanism that slows the rotation of the traveling motor and transmits the slowed rotation to the wheel mounting sleeve; and a circulation path and a lubricating oil pump disposed outside the wheel mounting sleeve, via which the reduction gear lubricating oil drawn out of the wheel mounting sleeve is cooled at an oil cooler and then made to travel back into the wheel mounting sleeve.

The traveling speed reduction gear lubricating oil cooling device in the work vehicle described above comprises:

a first temperature sensor that detects the temperature of the traveling motor;

a second temperature sensor disposed in the circulation path outside the wheel mounting sleeve, which detects the temperature of the lubricating oil;

a traveling motor reference temperature setting means for setting in advance a reference temperature for the traveling motor;

a motor temperature comparison means for comparing the temperature detected by the first temperature sensor with the reference temperature set for the traveling motor; and a startup operation control means for increasing the rotation speed of a drive motor for the lubricating oil pump in correspondence to a rise in the temperature detected by the second temperature sensor within a speed range lower than the normal operating speed upon determining that the temperature detected by the first temperature sensor is equal to or higher than the reference temperature set for the traveling motor.

The traveling speed reduction gear lubricating oil cooling device according to the present invention may further comprise:

a startup operation lubricating oil reference temperature setting means for setting a single startup operation lubricating oil reference temperature or a plurality of startup operation lubricating oil reference temperatures for a startup operation, lower than a reference temperature at which the lubricating oil is cooled during normal operation; and a startup operation lubricating oil temperature comparison means for comparing the temperature detected by the second temperature sensor with a startup operation lubricating oil reference temperature.

The startup operation control means in this traveling speed reduction gear lubricating oil cooling device increases the rotation speed of the drive motor for the lubricating oil pump in steps once the temperature detected by the second temperature sensor becomes equal to or higher than the startup operation lubricating oil reference temperature.

As an alternative, the traveling speed reduction gear lubricating oil cooling device according to the present invention may further comprise:

a motor speed calculation means for calculating through arithmetic operation a speed of the drive motor for the lubricating oil pump in correspondence to the temperature detected by the second temperature sensor.

The startup operation control means in this traveling speed reduction gear lubricating oil cooling device increases the rotation speed of the drive motor for the lubricating oil pump in correspondence to the rise in the temperature detected by the second temperature sensor based upon calculation results provided by the motor speed calculation means.

As a further alternative, the traveling speed reduction gear lubricating oil cooling device according to the present invention may further comprise:

a bypass valve constituted with a check valve, installed in an outlet-side piping located on the outlet side of the lubricating oil pump, via which the oil having been output is redirected toward an intake side when the lubricating oil pump outputs the lubricating oil with an excessive pressure;

a pressure sensor that detects the lubricating oil pressure at the outlet-side piping; and a reference output pressure setting means for setting a reference output pressure slightly lower than a cracking pressure at which the bypass valve cracks.

The startup operation control means in this traveling speed reduction gear lubricating oil cooling device has a function of temporarily stopping the drive motor for the lubricating oil pump when the output pressure at the bypass valve in the outlet-side piping becomes equal to or greater than the reference output pressure.

As yet another alternative, the traveling speed reduction gear lubricating oil cooling device according to the present invention may further comprise:

a bypass valve constituted with a check valve, installed in an outlet-side piping located on the outlet side of the lubricating oil pump, via which the oil having been output is redirected toward an intake side when the lubricating oil pump outputs the lubricating oil with an excessive pressure;

a pressure sensor that detects the lubricating oil pressure at the outlet-side piping; and a reference output pressure setting means for setting a reference output pressure slightly lower than a cracking pressure at which the bypass valve cracks.

The startup operation control means in this traveling speed reduction gear lubricating oil cooling device has a function of temporarily slows the drive motor for the lubricating oil pump when the output pressure at the bypass valve in the outlet-side piping becomes equal to or greater than the reference output pressure.

According to the present invention, the second temperature sensor is installed outside the wheel mounting sleeve to detect the lubricating oil temperature outside the wheel mounting sleeve and even if the second temperature sensor detects a lubricating oil temperature at a low level, which would imply that the lubricating oil does not require cooling, the startup operation control means in the vehicle controller starts up the lubricating oil pump. In other words, the drive motor for the lubricating oil pump is engaged in operation at low speed corresponding to the lubricating oil temperature detected by the second temperature sensor, which, in turn, corresponds to the temperature and, hence, the viscosity of the lubricating oil (viscous resistance) of the lubricating oil circulating via the lubricating oil pump. Thus, the drive motor can be engaged in continuous operation without placing excessive loads on the lubricating oil pump and the drive motor. As a result, the lubricating oil inside the wheel mounting sleeve can be drawn out of the wheel mounting sleeve and the temperature of the lubricating oil inside the wheel mounting sleeve can be detected by the second temperature sensor even when the work vehicle is engaged in operation in a cold environment.

In addition, the drive motor for the lubricating oil pump is controlled so that its speed increases as the detected temperature rises, i.e., as the viscosity of the lubricating oil becomes lower. Thus, the speed of the drive motor for the lubricating oil pump picks up promptly and the lubricating oil pump, able to output a greater quantity of lubricating oil, is engaged in operation under optimal conditions without placing an excessive load on the drive motor. In addition, since the high-viscosity, high-pressure lubricating oil is not supplied to the oil cooler, damage to the oil cooler is prevented.

According to the present invention detailed above, the lubricating oil pump can be started up even in a cold work environment without requiring a large capacity motor to drive the lubricating oil pump and ultimately, better cost effectiveness is assured. In addition, even in the event of a failure of the second temperature sensor, the second temperature sensor, disposed outside the wheel mounting sleeve, can be replaced easily and quickly without having to disengage the wheels or the traveling motor from the wheel mounting sleeve.

Furthermore, by equipping the lubricating oil cooling device according to the present invention with a startup operation lubricating oil reference temperature setting means and a startup operation lubricating oil temperature comparison means, the startup operation lubricating oil reference temperature can be adjusted in correspondence to the change occurring in the lubricating oil condition and thus control of the drive motor for the lubricating oil pump can be optimized in correspondence to the condition of the lubricating oil.

By adopting the present invention in a mode in which the rotation speed of the drive motor for the lubricating oil pump is increased in correspondence to the rise in the temperature detected by the second temperature sensor, the speed of the drive motor for the lubricating oil pump can be controlled continuously thereby enabling optimal control under which the output pressure at the lubricating oil pump is never allowed to rise to an excessively high level.

Furthermore, by adopting the present invention in a mode in which the drive motor for the lubricating oil pump is stopped once the output pressure detected by a pressure sensor reaches a level equal to or greater than the reference pressure close to the bypass valve cracking pressure so as to prevent damage to the oil cooler at the time of lubricating oil pump startup, it is ensured that no excessive lubricating oil output pressure is applied to the oil cooler and damage to the oil cooler can be prevented effectively. In addition, since little or no lubricating oil circulation is required in the bypass valve even as the output pressure at the lubricating oil pump rises to a very high level, the rise in the temperature of the lubricating oil outside the wheel mounting sleeve attributable to the circulating flow of the lubricating oil through the bypass valve is avoided. Ultimately, since the temperature detected by the second temperature sensor never fails to indicate the actual condition inside the wheel mounting sleeve, optimal motor control is enabled.

Moreover, by adopting the present invention in a mode in which the drive motor for the lubricating oil pump is slowed once the output pressure detected by a pressure sensor reaches a level equal to or greater than the reference pressure close to the bypass valve cracking pressure so as to prevent damage to the oil cooler at the time of lubricating oil pump startup, it is ensured that no excessive lubricating oil output pressure is applied to the oil cooler and damage to the oil cooler can be prevented effectively. In addition, since little or no lubricating oil circulation is required in the bypass valve even as the output pressure at the lubricating oil pump rises to a very high level, the rise in the temperature of the lubricating oil outside the wheel mounting sleeve attributable to the circulating flow of the lubricating oil through the bypass valve is avoided. Ultimately, since the temperature detected by the second temperature sensor never fails to indicate the actual condition inside the wheel mounting sleeve, optimal motor control is enabled.

In addition, even if the output pressure at the lubricating oil pump rises to a level equal to or greater than the reference output pressure, the operation is allowed to continue in the decelerated state without stopping the lubricating oil pump, and as a result, the lubricating oil in the wheel mounting sleeve is continuously drawn out. In other words, by slowing the drive motor instead of stopping the lubricating oil pump, an undesirable decrease in the lubricating oil temperature can be prevented more effectively and thus, even better drive motor speed control is enabled.

BEST MODE FOR CARRYING OUT THE INVENTION

Figure 1:
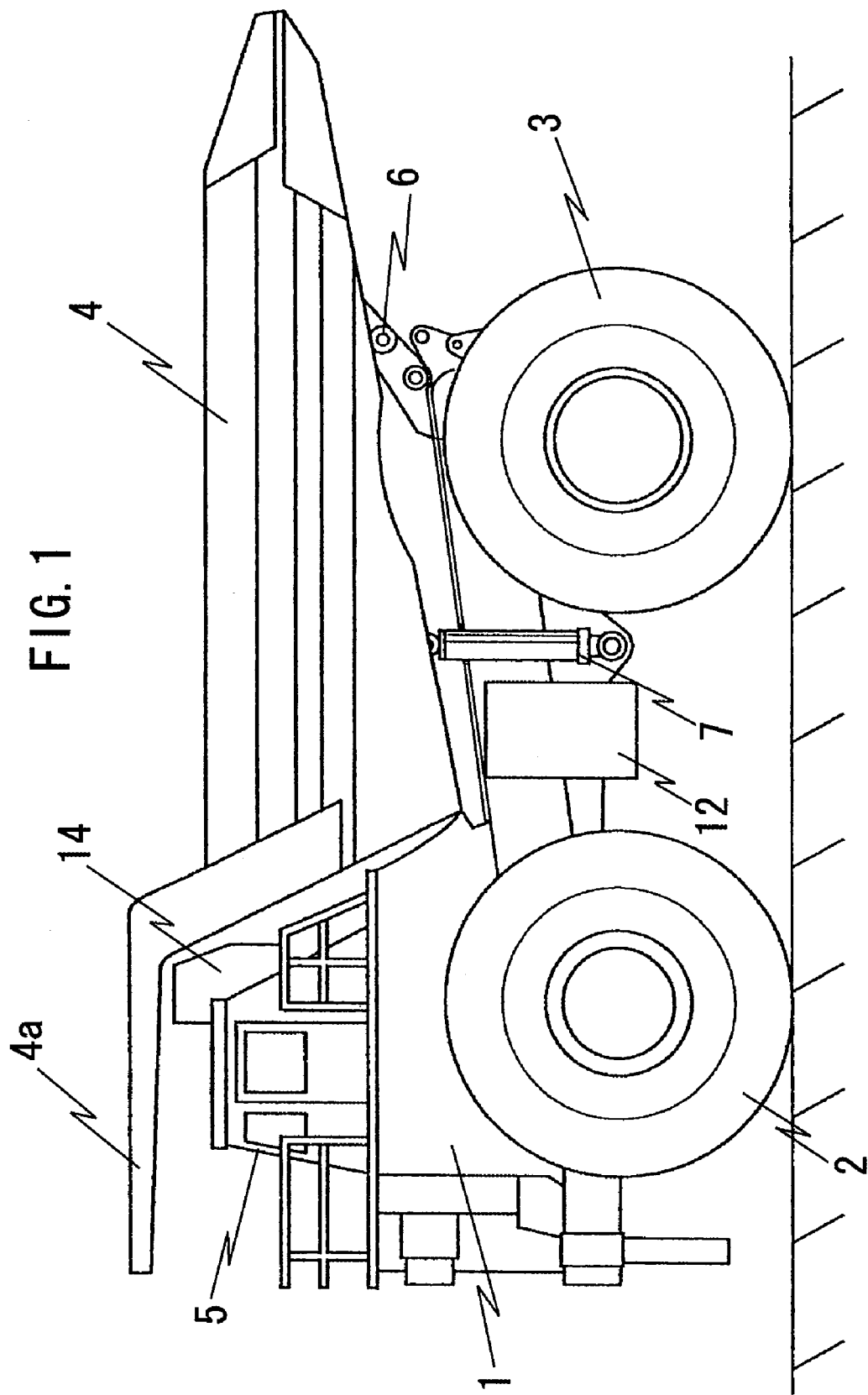
FIG. 1 is a side elevation showing a work vehicle that may adopt the present invention.

FIG. 1 is a side elevation of a large work vehicle that may adopt the present invention. The work vehicle in the example presented in the figure is a dump truck. The dump truck assuming a sturdy frame structure comprises a chassis 1 that includes front wheels 2 and rear wheels 3, a body 4 that functions as a load carrying platform and a cabin 5. The body 4 and the cabin 5 are disposed upon the chassis 1. The body 4 is a large container, the full length of which ranges 10~13 m, used to carry heavy loads such as crushed rock or coal, in large volumes. The body 4 includes a hood 4*a*, formed as an integrated part thereof and located at the top thereof on the front side so as to cover the cabin 5 from above. The body 4 is tiltably mounted at the chassis 1 via a pin link unit 6 located on the rear side. Reference numeral 7 indicates a hoisting cylinder that hoists one end the body 4 up/down to tilt the body.

The front wheels 2 are steerable wheels via which the dump truck is steered by the driver. The rear wheels 3, which include two left rear wheels and two right rear wheels, constitute the drive wheels of the dump truck. The front wheels 2 and the rear wheels 3 are large wheels, the outer diameter of which may be as large as 2~4 m.

Figure 2:
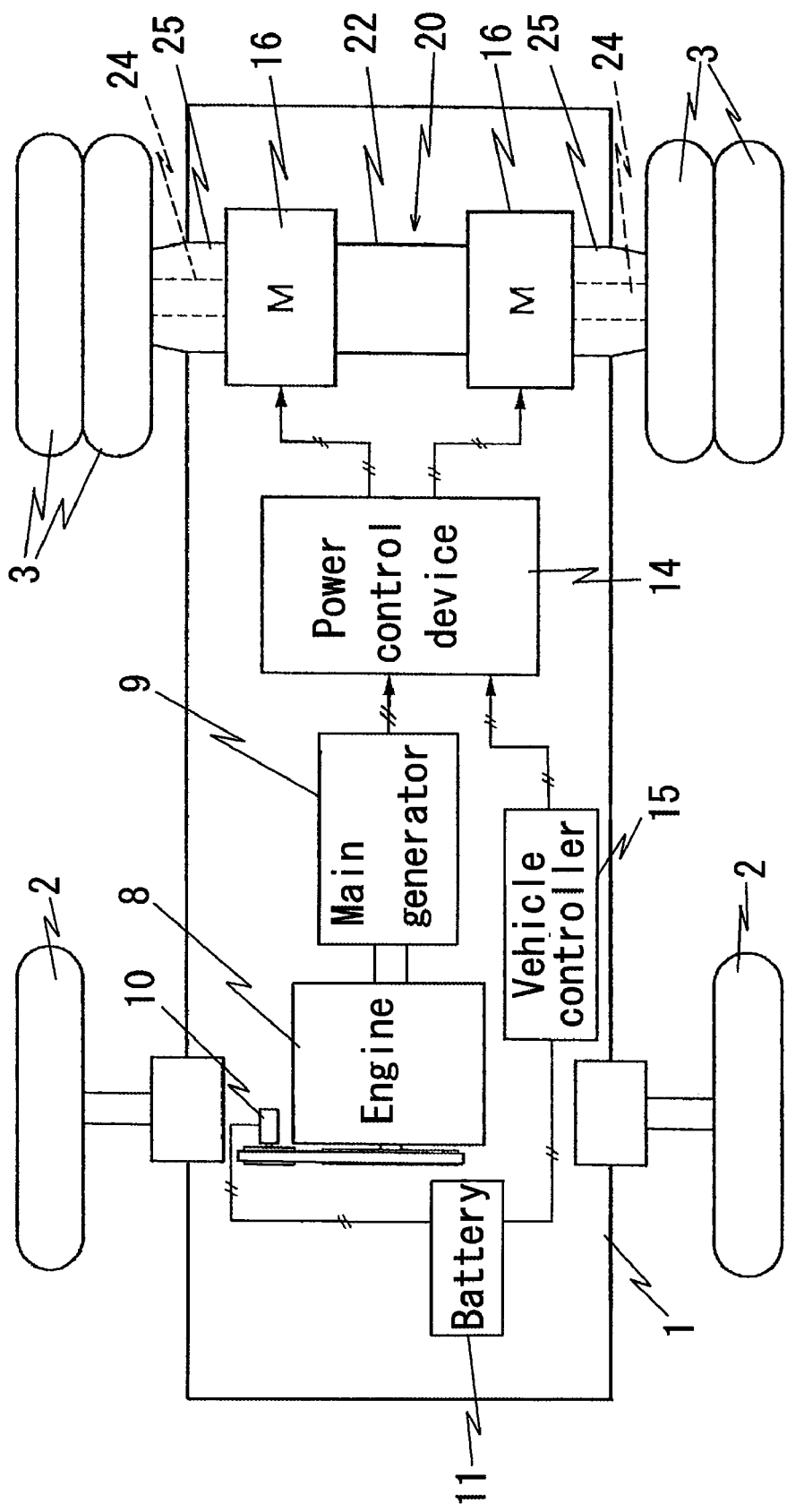
FIG. 2 is a block diagram showing the structure of a traveling drive device that may adopt the present invention.

FIG. 2 is a plan view showing the overall structure of the work vehicle. Reference numeral 8 in FIG. 2 indicates an engine that functions as a prime mover, installed below the cabin 5 above the chassis 1. The engine 8 may be, for instance, a large diesel engine. The engine 8 generates three-phase AC power (at, for instance, 1500 kW) by driving a main generator 9. The engine 8 also drives a sub-generator 10 that generates a DC voltage of, for instance, 24V. Reference numeral 11 indicates a battery charged by the sub-generator 10. In addition, the engine 8 has a function of circulating pressure oil through the hoisting cylinder 7 that tilts the body 4 up/down, a steering cylinder (not shown) and the like by rotationally driving a hydraulic pump (not shown) used as a hydraulic source. As shown in FIG. 1, a hydraulic operating fluid tank 12 into which the hydraulic operating fluid output from the hydraulic pump is collected is mounted at the side of the chassis 1.

Reference numeral 14 in FIG. 2 indicates a power control device which, together with a vehicle controller 15, executes power control for the dump truck. The vehicle controller 15 operates on the power sourced from the battery 11. As shown in FIG. 1, the power control device 14, located at the side of the cabin 5, is constituted with a distribution control panel disposed in an upright orientation above the chassis 1 and the like. The power control device 14 drives traveling motors 16, which are AC electric motors, a drive motor 18 (see FIG. 3) for lubricating oil pumps 17 and the like with the power generated at the main generator 9 in conformance to a control signal output from the vehicle controller 15 shown in FIG. 2. It is to be noted that the rotation rates of the traveling motors 16 are independently regulated under feedback control.

Reference numeral 20 indicates a traveling drive device that includes the traveling motors 16 installed at the rear of the dump truck. The traveling drive device 20 comprises the traveling motors 16 disposed on the left side and the right side, a motor housing sleeve 22 housing the left/right traveling motors 16, rotating shafts 24 rotationally driven by the traveling motors 16, reduction gear units 27 (see FIG. 3) and the like.

Figure 3:
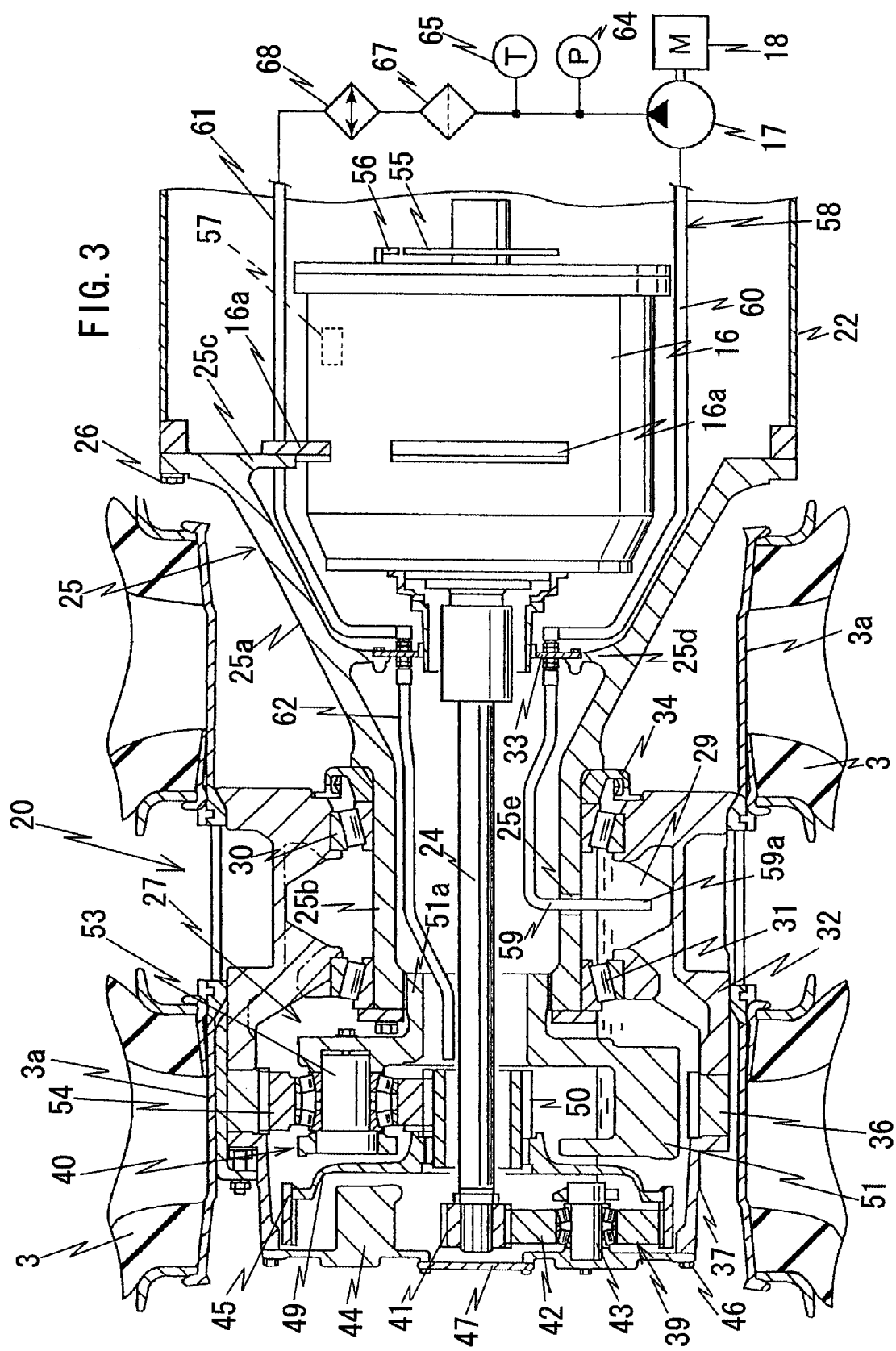
FIG. 3 shows the structure of a traveling drive device that includes the lubricating oil cooling device achieved in an embodiment of the present invention.

FIG. 3 shows the piping connection at the lubricating oil cooling device as well as the structures of the traveling motors 16, the reduction gear units 27 and the like. FIG. 3 shows a tubular spindle 25 detachably mounted via a bolt 26, to an outer end of the motor housing sleeve 22 along the axial direction. The tubular spindle 25 includes a tapered portion 25*a* assuming a smaller diameter on the outer side along the axial direction and a small diameter portion 25*b* extending further out from the tapered portion 25*a*. A wheel mounting sleeve 32 is rotatably fitted on the outside of the small diameter portion 25*b* via bearings 30 and 31. Rims 3*a* of the two wheels 3 on either side are locked onto the outside of the wheel mounting sleeve 32.

At the inner end of the tapered portion 25*a* of the tubular spindle 25, a plurality of mounting seats 25*c* projecting inward along the radial direction are formed as integrated parts thereof. By placing a mounting flange 16*a* at the outer circumference of the corresponding traveling motor 16 in alignment with the mounting seats 25*c* and fastening them together with bolts (not shown), the traveling motor 16 is attached onto the tubular spindle 25. In addition, a ring-shaped mounting portion 25*d* projecting inward along the radial direction is formed on the inner circumferential side of the tapered portion 25*a* at the tubular spindle 25 and a partitioning wall 33 separating the traveling motor 16 from the reduction gear units housing is installed between the mounting portion 25*d* and the traveling motor 16. Reference numeral 34 indicates a seal member disposed between the outer circumference of the tubular spindle 25 and the wheel mounting sleeve 32. The seal member 34 prevents leakage of lubricating oil 29 collected inside the wheel mounting sleeve 32 and also prevents any dust or the like originating from the outside from entering the wheel mounting sleeve 32.

The reduction gear unit 27 disposed between each rotating shaft 24 and the wheel mounting sleeve 32 is now described. An internal gear 36 and an outer drum 37 are locked via long bolts (not shown) onto the outer end of the wheel mounting sleeve 32. The reduction gear unit 27 includes a first reduction gear mechanism 39 and a second reduction gear mechanism 40. The first reduction gear mechanism 39 is constituted with a sun gear 41 connected to the front end of the rotating shaft 24 via a spline, a plurality of (e.g., 3) planetary gears 42 (only one planetary gear is shown) that rotate due to the rotation of the sun gear 41, a carrier 44 rotatably supporting each planetary gear 42 via a support pin 43 and an internal gear 45 interlocking with the planetary gears 42. The carrier 44 is detachably fixed onto the outer end of the outer drum 37 via bolts 46. An inspection window is formed at the center of the carrier 44 with a lid 47 detachably mounted via a bolt at the window opening.

The second reduction gear mechanism 40 includes a sun gear 50, a carrier 51, an internal gear 36 and a planetary gear 54. The sun gear 50 is disposed concentrically with the rotating shaft 24 via a coupling 49 provided as an integrated part of the internal gear 45 at the first reduction gear mechanism 39. The carrier 51 includes a tubular portion 51a which is detachably fitted inside the outer end of the small diameter portion 25b of the tubular spindle 25 via a spline or the like by ensuring that rotation of the tubular portion 51a is disallowed. The internal gear 36 is fixed to the wheel mounting sleeve 32. The planetary gear 54 rotatably attached to one of, for instance, three support pins 53 locked onto the carrier 51, interlock with the sun gear 50 and the internal gear 36.

The reduction gear unit 27, constituted with the first reduction gear mechanism 39 and the second reduction gear mechanism 40 described above, causes the wheels 3 to rotate with great torque at a rotation speed lowered to approximately 1/30~1/40, for instance, of the rotation speed of the rotating shaft 24 rotated by the traveling motor 16.

Reference numeral 55 indicates a disk attached to the rotating shaft 24 of the traveling motor 16 and reference numeral 56 indicates a speed sensor disposed so as to face opposite the outer circumference of the disk. The speed sensor 56 detects the rotation speed of the rotating shaft 24 of the traveling motor 16. The traveling motor 16 is an electric motor regulated under inverter control and a temperature sensor (hereafter referred to as a first temperature sensor) 57 that detects the temperature of the traveling motor 16 is installed at the stator thereof.

Figure 4:
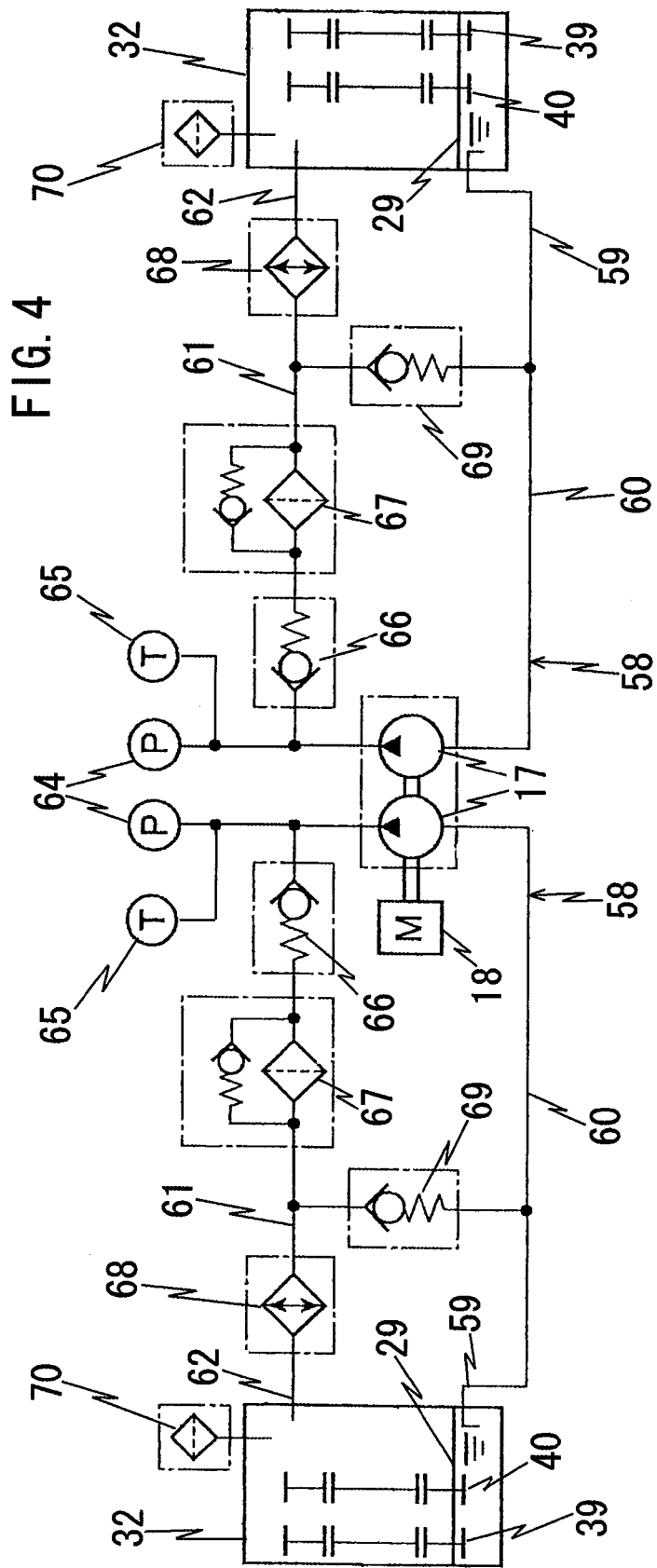
FIG. 4 is a system diagram of the lubricating oil cooling device achieved in the embodiment.

Next, the lubricating oil cooling device that cools the lubricating oil supplied to the reduction gear units 27 is described. FIG. 4 is a system diagram of the lubricating oil cooling device. Two lubricating oil pumps 17 are disposed, one in correspondence to the left wheels 3 and the other in correspondence to the right wheels 3 and two lubricating oil circulation paths 58 and 58 are formed, one in correspondence to the left wheels 3 and the other in correspondence to the right wheels 3. The two lubricating oil pumps 17 and 17 are driven via a single drive motor 18. It is to be noted that the two lubricating oil pumps 17 may each be driven by a dedicated drive motor 18, instead.

As shown in FIGS. 3 and 4, the circulation paths 58 are each made up with an intake piping 59 disposed further outward along the axial direction relative to the partitioning wall 33 inside the tubular spindle 25, an intake piping 60 connected to the intake piping 59 over an area where the partitioning wall 33 is present, with an inner end thereof connected to an intake port of the lubricating oil pump 17, a delivery piping 61 ranging from an outlet port of the lubricating oil pump 17 to the partitioning wall 33 and a delivery piping 62 connected to the delivery piping 61 over an area where the partitioning wall 33 is present and disposed further outward along the axial direction relative to the partitioning wall 33 inside the tubular spindle 25.

Figure 5:
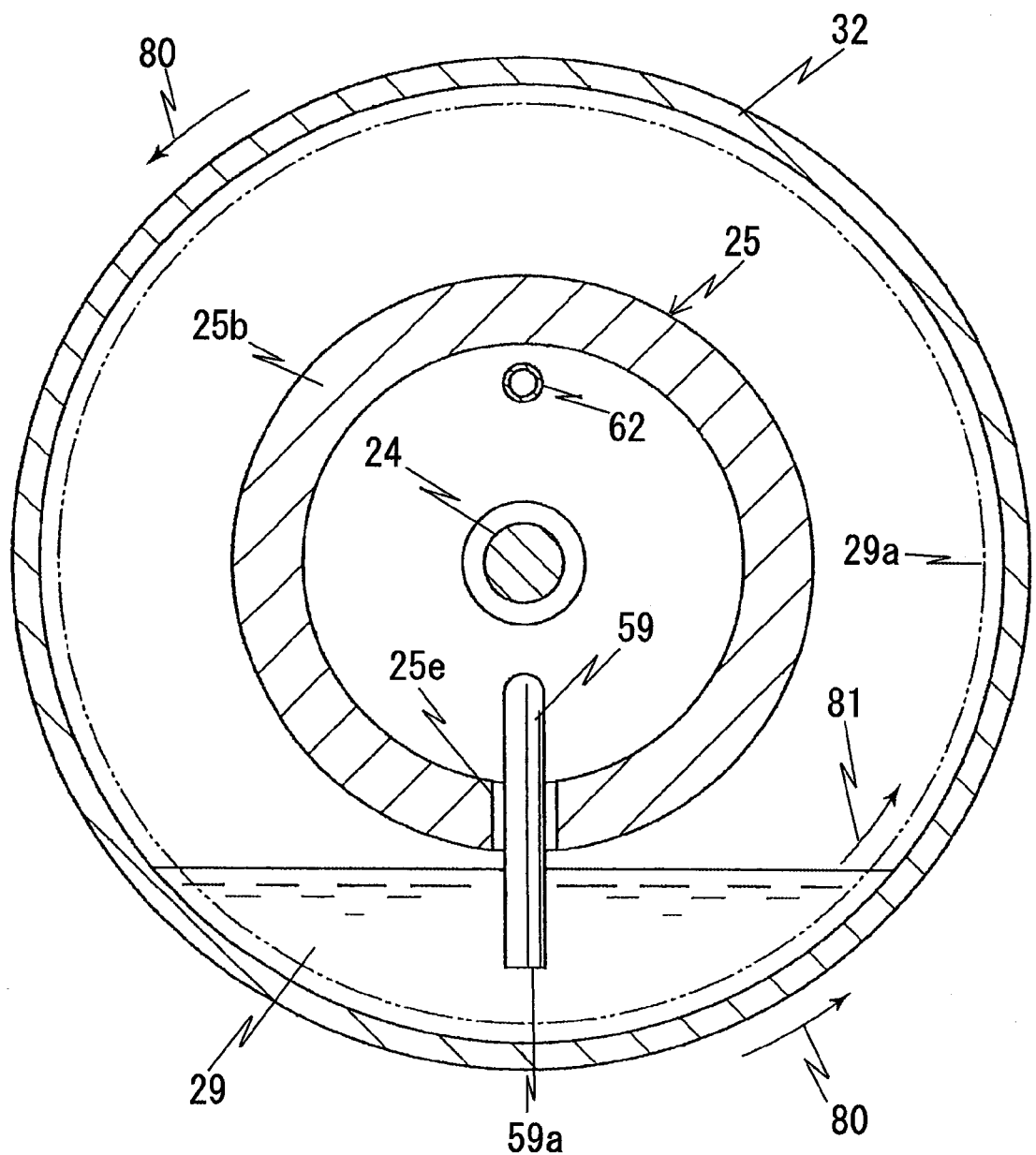
FIG. 5 is a sectional view showing the positional relationship between the lubricating oil and the intake pipings as observed in the embodiment.

As shown in FIGS. 3 and 5, the intake piping 59 is inserted through a hole 25e formed at the bottom of the small diameter portion 25b of the tubular spindle 25, and its intake port 59a at the lower end is immersed in the lubricating oil 29 collected at the bottom of the wheel mounting sleeve 32. The delivery piping 62 disposed further outward along the axial direction relative to the partitioning wall 33 travels through the tubular spindle 25 and its front end faces opposite the carrier 51, as shown in FIG. 3.

Figure 6:
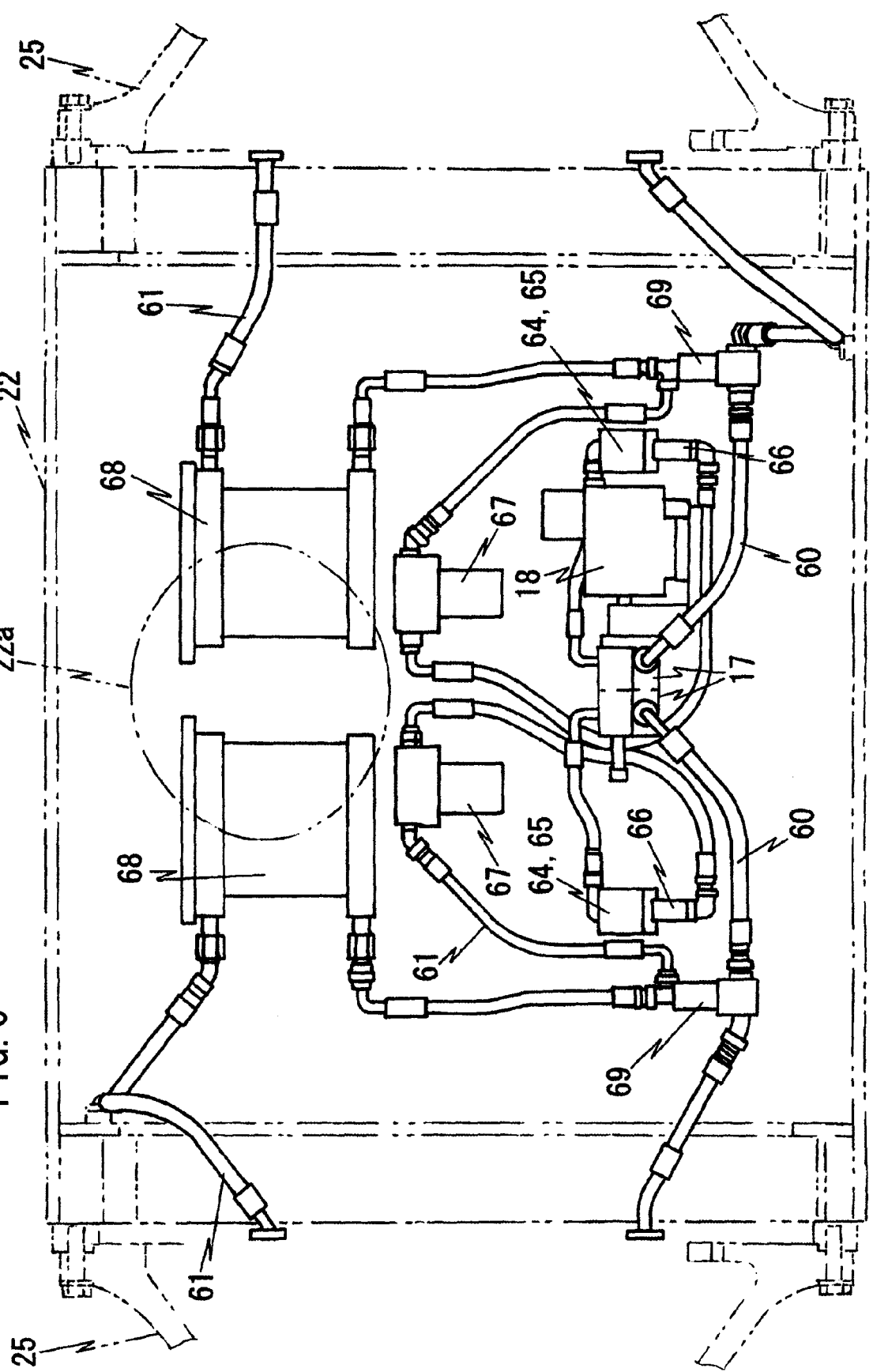
FIG. 6 is a see-through view of the components constituting the lubricating oil cooling device in the embodiment, taken from the cabin side.

FIG. 6 is a see-through view of the components disposed inside the motor housing sleeve 22, taken from the side (front side) where the cabin 5 is present. FIG. 6 does not include an illustration of the traveling motors 16. As shown in FIGS. 4 and 6, a pressure sensor 64 that detects the pressure (output pressure) of the lubricating oil having been output, a temperature sensor (hereafter referred to as a second temperature sensor) 65 that detects the lubricating oil temperature, a pressure holding valve 66, a dust filter 67 and an oil cooler 68 are disposed at the delivery piping 61 of each lubricating oil pump 17. It is to be noted that the lubricating oil pumps 17 each include two input ports and two output ports. In addition, the pressure sensor 64 and the second temperature sensor 65 are housed inside a single case. The pressure holding valve 66 opens at a cracking pressure of, for instance, approximately 0.15 MPa so as to distribute the lubricating oil output from the lubricating oil pump 17 towards the downstream side where the filter 67 is installed.

The oil cooler 68 cools the lubricating oil with cooling air from the motor cooling system, driven by a fan (not shown) mounted on the chassis 1 at a position further forward relative to the motor housing sleeve 22, and supplied thereto via an air supply hole 22a formed at the front surface of the motor housing sleeve 22.

Reference numeral 69 indicates a bypass valve disposed between the upstream side relative to the oil cooler 68 at the delivery piping 61 and the intake piping 60 for purposes of protecting the oil cooler 68. The bypass valve 69, which is constituted with a check valve, opens if the lubricating oil pressure inside the delivery piping 61 rises to an excessively high pressure level (P2) so as to cause the lubricating oil in the delivery piping 61 to flow back toward the intake piping 60. The cracking pressure for the bypass valve 69 is set to, for instance, approximately 0.4~0.6 MPa, lower than the 1 MPa level at which damage to the oil cooler 68 may occur. It is to be noted that reference numeral 70 in FIG. 4 indicates an air breather, which is installed above each wheel mounting sleeve 32 and has a function of preventing fluctuation of the air pressure inside the wheel mounting sleeve 32 due to the internal temperature affecting the air pressure inside the wheel mounting sleeve 32 and thus sustaining the internal pressure substantially at one atmosphere.

Figure 7:
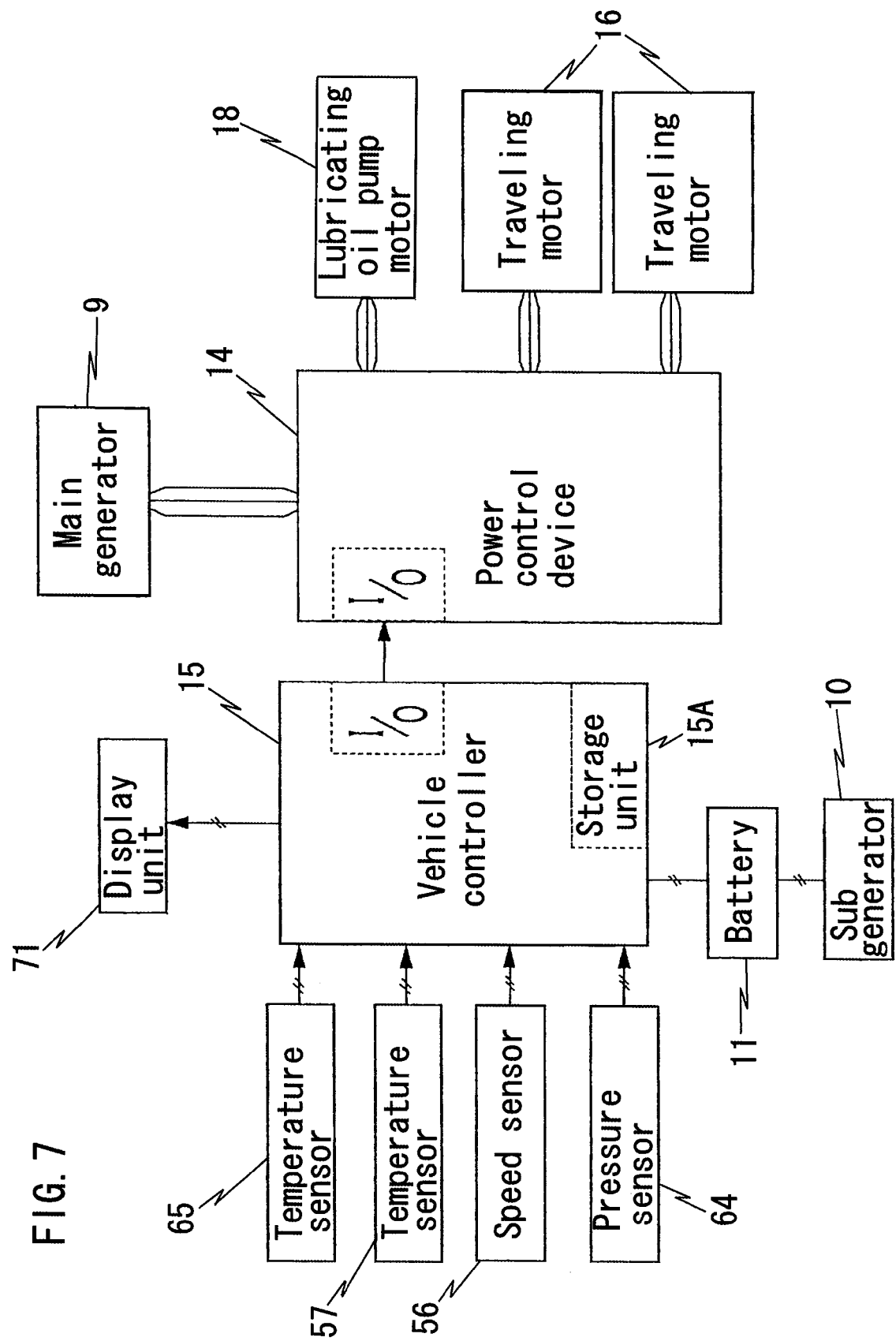
FIG. 7 is a control block diagram of the traveling drive device achieved in the embodiment.

FIG. 7 is a control block diagram pertaining to the traveling motors 16 and the lubricating oil pump drive motor 18. As illustrated in the figure, detection signals originating from the speed sensor 56 corresponding to each traveling motor 16, the pressure sensor 64, the first temperature sensor 57 and the second temperature sensor 65 are input to the vehicle controller 15, which operates on power sourced from the battery 11. A display unit 71 installed in the cabin 5 is connected to the output side of the vehicle controller 15. The power control device 14 is also connected to the output side of the vehicle controller 15. The operator is able to view alarm information indicating a sensor error or the like brought up on display at the display unit 71. The vehicle controller 15 includes a storage unit 15A constituted with a ROM, a RAM (which may be a nonvolatile memory) and the like, and reference values and the like, to be compared with the temperatures and the pressures detected by the first and second temperature sensors 57 and 65 and the pressure sensors 64 are stored in the storage unit 15A. In addition, a lubricating oil supply control program, based upon which the drive motor 18 for the lubricating oil pumps 17 is driven and turned off and the like, is stored in the storage unit.

Figure 8:
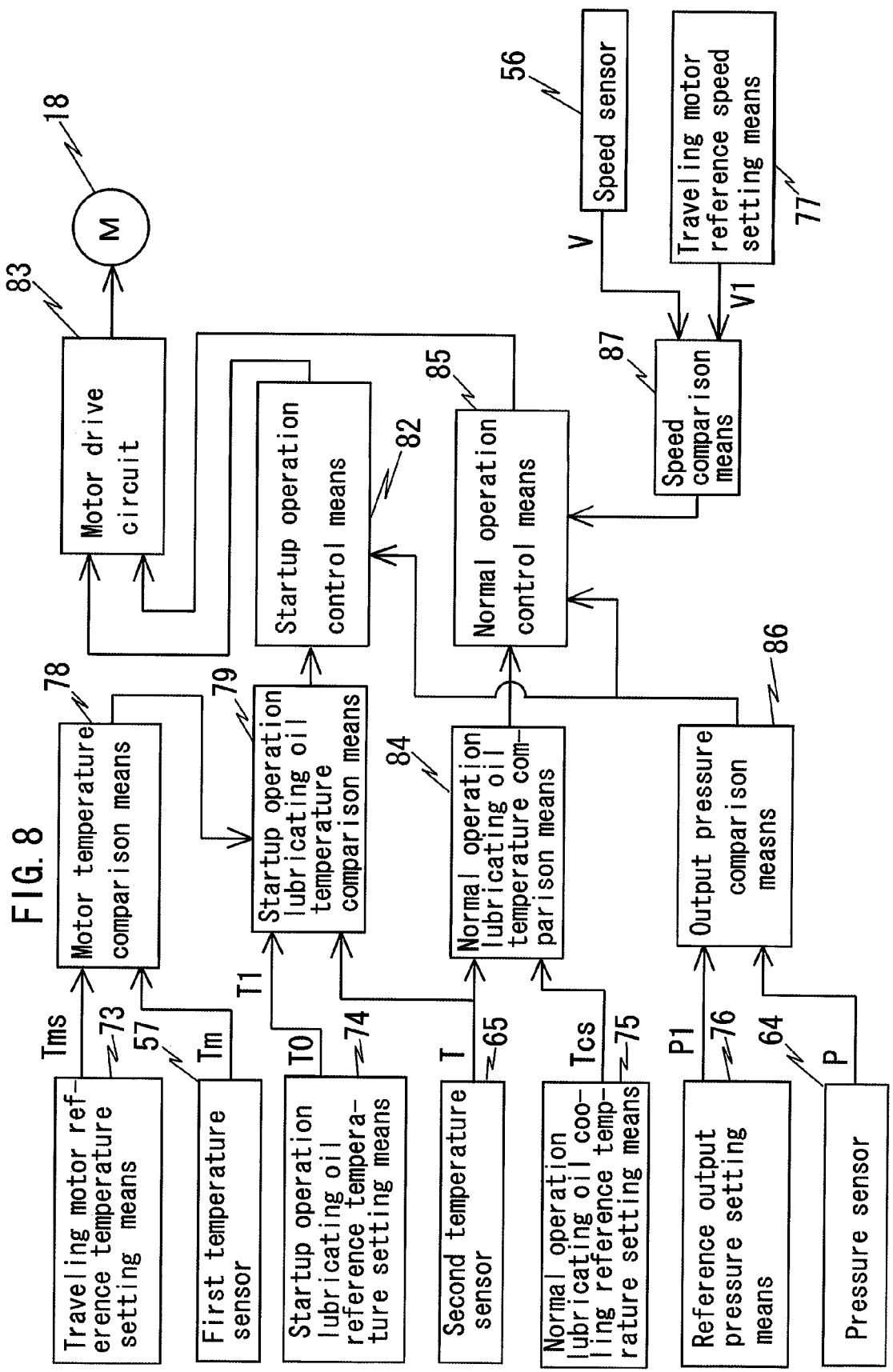
FIG. 8 is a function block diagram of the lubricating oil cooling device achieved in the embodiment.

FIG. 8 is a control function block diagram of the control executed on the drive motor 18 for the lubricating oil pumps 17, based upon a program installed in the vehicle controller 15 shown in FIG. 7. The control device shown in FIG. 8 comprises a traveling motor reference temperature setting means 73 for setting a traveling motor reference temperature Tms, a startup operation lubricating oil reference temperature setting means 74 for setting startup operation lubricating oil reference temperatures T0 and T1, a lubricating oil reference temperature setting means 75 for setting a reference temperature Tcs used as a criterion as to whether or not to cool the lubricating oil during normal operation, a reference output pressure setting means 76 for setting a reference output pressure P1 used as a criterion when judging whether or not air is being taken in and a traveling motor reference speed setting means 77 for setting a traveling motor reference speed V1. These setting means are all embodied as switches, a keyboard or the like constituting part of the vehicle controller 15.

The traveling motor reference temperature Tms set by the traveling motor reference temperature setting means 73 represents the temperature of the traveling motors 16 having risen following a start of a traveling operation of the work vehicle, at which activation of the drive motor 18 is deemed necessary. The traveling motor reference temperature may be set to, for instance, 50° C. The temperatures at the traveling motors 16 are referenced as described above, since as proven through experience, the temperature of the lubricating oil 29 in the reduction gear units 27 rises in direct correlation with an increase in the temperatures of the traveling motors 16.

The startup operation lubricating oil reference temperature setting means 74 sets a plurality of reference temperatures T0 (e.g., 5° C.) and T1 (e.g., 35° C.), invariably lower than the temperature at which the cooling of the lubricating oil becomes necessary, so as to adjust, at the start of the traveling operation of the work vehicle, the rotation speed of the drive motor 18 in correspondence to the viscosity, which changes in correspondence to the lubricating oil temperature.

The reference temperature Tcs set by the normal operation lubricating oil cooling reference temperature setting means 75 is a criterion used when deciding whether or not to cool the lubricating oil during normal operation. The reference temperature Tcs may be set to, for instance, 55° C. The reference output pressure setting means 76 sets the reference output pressure P1 (e.g., 0.1 MPa) pertaining to a low output pressure level at which the lubricating oil pumps 17 run the risk of taking in air, in order to prevent air intake at the lubricating oil pumps 17.

The traveling motor reference speed setting means 77 sets the speed V1 at which air may be taken in through the intake port 59a of the intake pipings 59, one of which is shown in FIG. 5 during normal operation. The undesirable air intake phenomenon is now described in further detail. As the vehicle travels with each wheel mounting sleeve 32 rotating along the direction indicated by the arrow 80 in FIG. 5, the increase in the centrifugal force attributable to the rising rotation speed causes the lubricating oil 29 to move upward along the inner wall of the wheel mounting sleeve 32, as indicated by the arrow 81. This may cause the surface level of the lubricating oil 29 to become lower than the intake port 59a of the intake piping 59 and in such a case, air will be taken in through the intake port 59a as the lubricating oil pump 17 is engaged in operation.

A motor temperature comparison means 78 compares the reference temperature Tms set by the traveling motor reference temperature setting means 73 with the temperature Tm of the traveling motor 17 detected by each first temperature sensor 57. When Tm is determined to be equal to or greater than Tms, a lubricating oil temperature comparison means 79 is started up or the output of the comparison means 79 is provided to a startup operation control means 82.

The startup operation lubricating oil temperature comparison means 79 compares the temperature T of the lubricating oil in the circulation path 58 detected by each second temperature sensor 65 with the reference temperatures T0 and T1 set by the startup operation lubricating oil temperature setting means 74 so as to determine the current level of the lubricating oil temperature T and transmits a signal indicating the current temperature level to the startup operation control means 82.

Depending upon whether the lubricating oil temperature T is higher or lower than the reference temperature T0 or T1, the startup operation control means 82 adjusts the control signal to be provided to a motor drive circuit 83 so as to alter the speed of the drive motor 18 for the lubricating oil pumps 17 in steps.

A normal operation lubricating oil temperature comparison means 84 makes a decision as to whether or not the lubricating oil temperature T detected by each second temperature sensor 65 is currently equal to or higher than the temperature Tcs set by the lubricating oil cooling reference temperature setting means 75 and provides the decision-making results to a normal operation control means 85.

The normal operation control means 85 does not engage the drive motor 18 if the lubricating oil temperature T detected by the second temperature sensor 65 is lower than the temperature Tcs set by the normal operation lubricating oil cooling reference temperature setting means 75, engages the drive motor 18 in operation via the motor drive circuit 83 once the lubricating oil temperature T becomes equal to or higher than the temperature Tcs to drive the lubricating oil pumps 17, and thus cools the lubricating oil by circulating the lubricating oil 29 in the wheel mounting sleeves 32 through the circulation path 58, the lubricating oil pumps 17 and the oil coolers 68.

An output pressure comparison means 86 compares the output pressure P detected by each pressure sensor 64 with the reference output pressure P1 set by the reference output pressure setting means 76. If P<P1, it judges that air is being taken in and accordingly turns off the drive motor 18 engaged in operation via the startup operation control means 82 and the normal operation control means 85, whereas if P≧P1, the drive motor is sustained in the engaged state via the startup operation control means 82 or the normal operation control means 85.

A speed comparison means 87 compares the speed V of the traveling motor 16 detected by each speed sensor 56 with the speed V1 set by the traveling motor speed setting means 77. As details later, the normal operation control means 85 stops the drive motor 18 once V becomes greater than V1, whereas it starts up the drive motor 18 or sustains the drive motor 18 in the engaged state as long as V is equal to or less than V1.

Next, the operation of the vehicle controller 15 in FIG. 8 is described. As indicated in the flowchart presented in FIG. 9, following the start of the traveling operation of the work vehicle, the temperature Tm of the traveling motor 16 detected by each first temperature sensor 57 is read into the vehicle controller 15 (step 1). The motor temperature comparison means 78 compares the temperature Tm of the traveling motor 16 with a reference temperature Tms (e.g., 50° C.) set by the traveling motor reference temperature setting means 73 (step 2) and the operation returns to step 1 if Tm is less than Tms. Once Tm becomes equal to or greater than Tms, it is judged that the temperature of the lubricating oil inside the wheel mounting sleeves 32 may have risen to a level requiring cooling and accordingly, the operation enters the lubricating oil pump startup routine (step 3).

Figure 10:
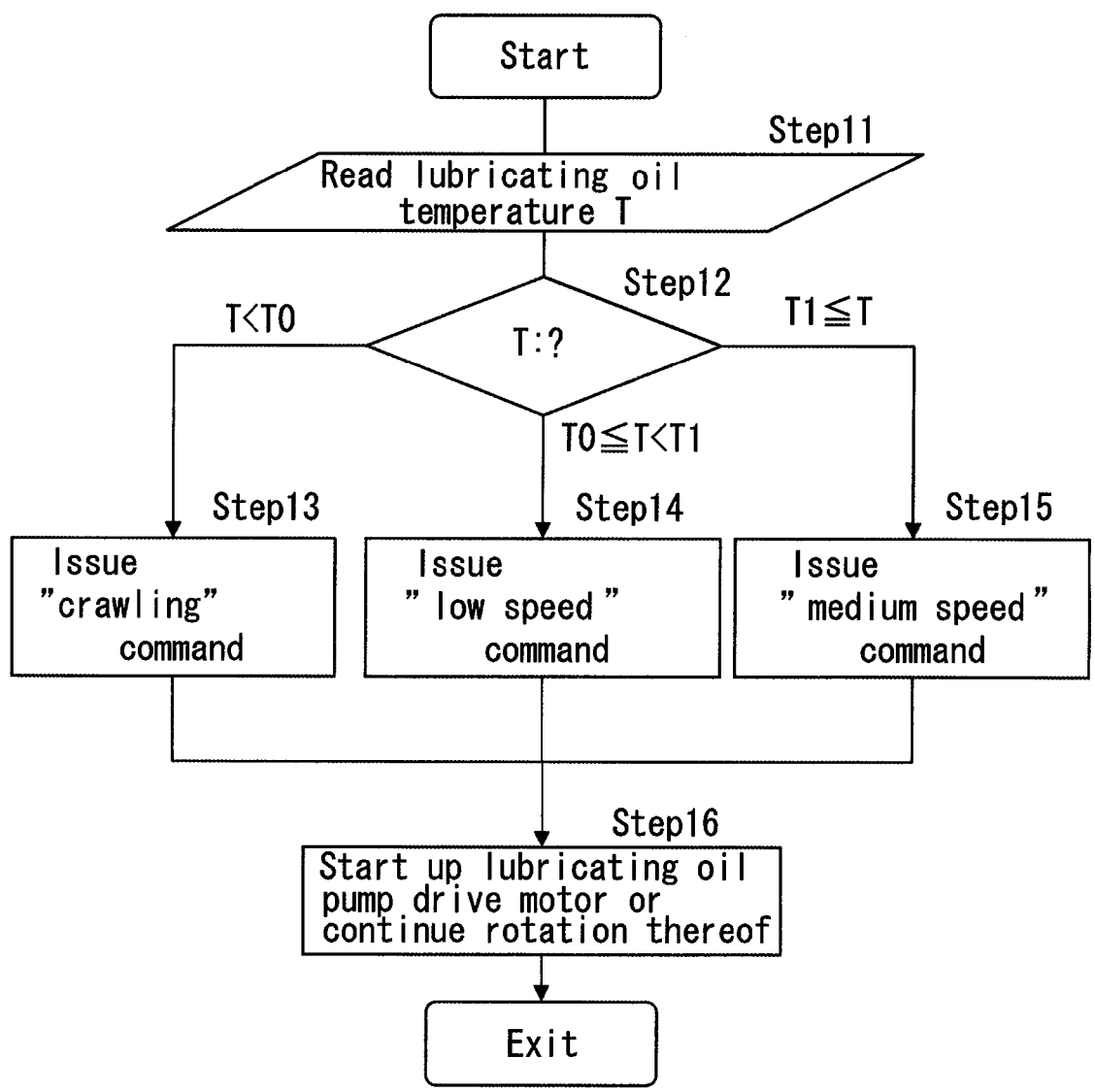
FIG. 10 presents a detailed flowchart of the startup operation executed in the embodiment.

In the lubricating oil pump startup routine shown in FIG. 10, the lubricating oil temperature T in the circulation path 58 detected by each second temperature sensor 65 is read into the vehicle controller 15 (step 11). Next, the lubricating oil temperature comparison means 79 compares the lubricating oil temperature T with the reference temperature T0 (e.g., 5° C.) and the reference temperature T1 (e.g., 35° C.) (step 12). If T is determined to be less than T0, the startup operation control means 82 issues a crawling command to the motor drive circuit 83 so as to drive the drive motor at, for instance, 4 Hz (the preferred range is 3~6 Hz) (steps 13 and 16). If, on the other hand, T0≦T<T1, the startup operation control means 82 issues a low speed command to the motor drive circuit 83 so as to drive the drive motor 18 at, for instance, 15 Hz (the preferred range is 10~20 Hz) (steps 14 and 16). If T is equal to or greater than T1, the startup operation control means 82 issues a medium speed command to the motor drive circuit 83 so as to drive the drive motor 18 at, for instance, 50 Hz (the preferred range is 40~60 Hz) (steps 15 and 16).

Figure 12:
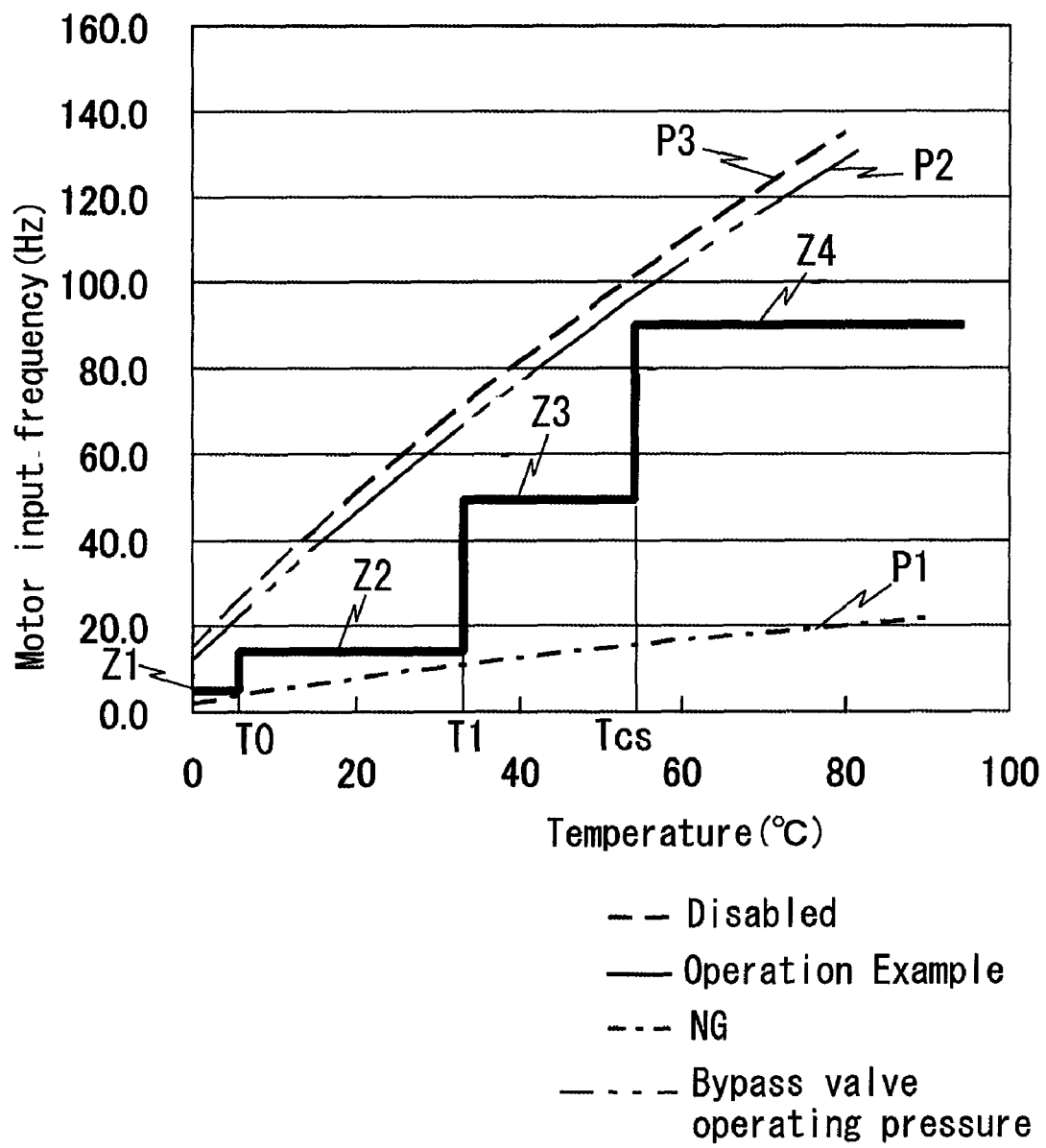
FIG. 12 presents an example of motor operation control that may be executed in the embodiment.

FIG. 12 presents an example of motor operation control under which the input frequency at the drive motor 18 is adjusted in correspondence to the lubricating oil temperature T. In this example, Z1 is set to 4 Hz, Z2 is set to 15 Hz and Z3 is set to 50 Hz. In addition, P1 in FIG. 12 represents the output pressure at the lubricating oil pumps 17 at which an air intake is assumed to occur. P2 represents the output pressure corresponding to the cracking pressure (e.g., 0.47 MPa) at which the bypass valves 68 are assumed to crack. P3 represents the output pressure at which damage to the oil coolers 69 may occur (e.g., 1.0 Mpa).

Figure 9:
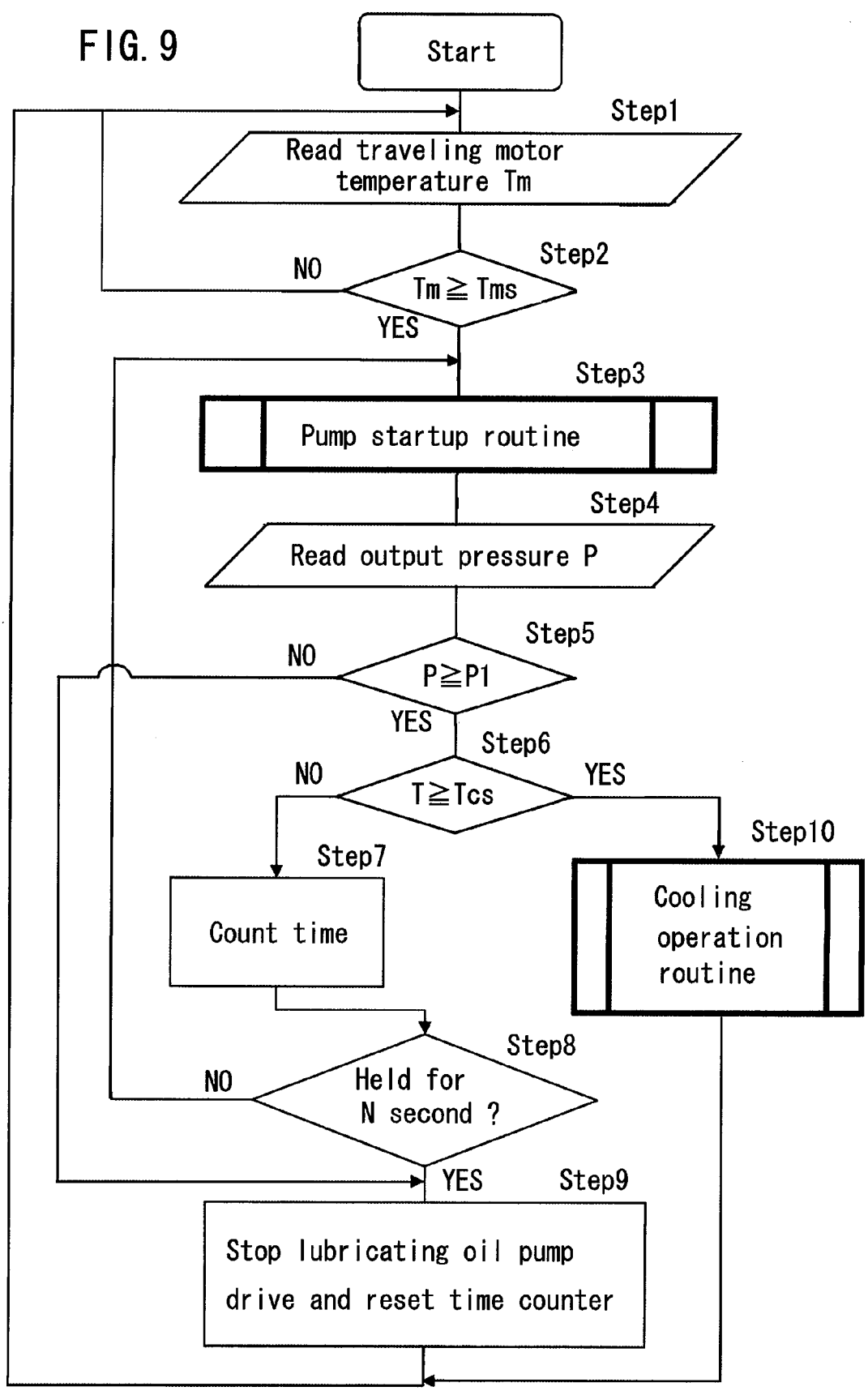
FIG. 9 presents a flowchart of the startup operation executed in the embodiment.

After engaging the drive motor 18 (lubricating oil pumps 17) in operation at the speed corresponding to the lubricating oil temperature detected by the second temperature sensors 65 through the processing executed in steps 12~16, the operation returns to the processing in FIG. 9. The lubricating oil output pressure P detected by each pressure sensor 64 is read in to the vehicle controller 15 (step 4). The output pressure comparison means 86 compares the lubricating oil output pressure P detected by the pressure sensor 64 with the reference output pressure P1 (e.g., 0.1 MPa) set by the lubricating oil output pressure setting means 76 (step 5). If P≧P1, the operation shifts into step 6. If P<P1, the drive motor 18 is judged to be running the risk of an air intake and, accordingly, the drive motor 18 is turned off (step 9).

In step 6, a decision is made as to whether or not the lubricating oil temperature T detected by the second temperature sensors 65 has reached Tcs (e.g., 55° C.) at which normal operation should commence. If T is determined to be less than Tcs, a time counter included in the vehicle controller 15 is started up or the time count on the time counter is continued (step 7). The time counter counts the cumulative length of time over which the lubricating oil pumps have been engaged in operation following the lubricating oil pump startup. Next, in step 8, a decision is made as to whether or not the lubricating oil pumps 17 have been engaged in operation for N seconds (e.g., 300~600 seconds) representing the length of time deemed to elapse before the lubricating oil, the temperature of which is detected by the second temperature sensors 65, is completely made up with the lubricating oil originating from the inside of the wheel mounting sleeves 32. If it is decided that the lubricating oil pumps have been engaged in operation for N seconds, the drive motor 18 and consequently the lubricating oil pumps 17 are turned off and also the time counter is reset (step 9). If the length of time over which the lubricating oil pumps 17 have been engaged in operation during the startup phase has not reached N seconds, the operation returns to the startup routine in step 3.

Figure 11:
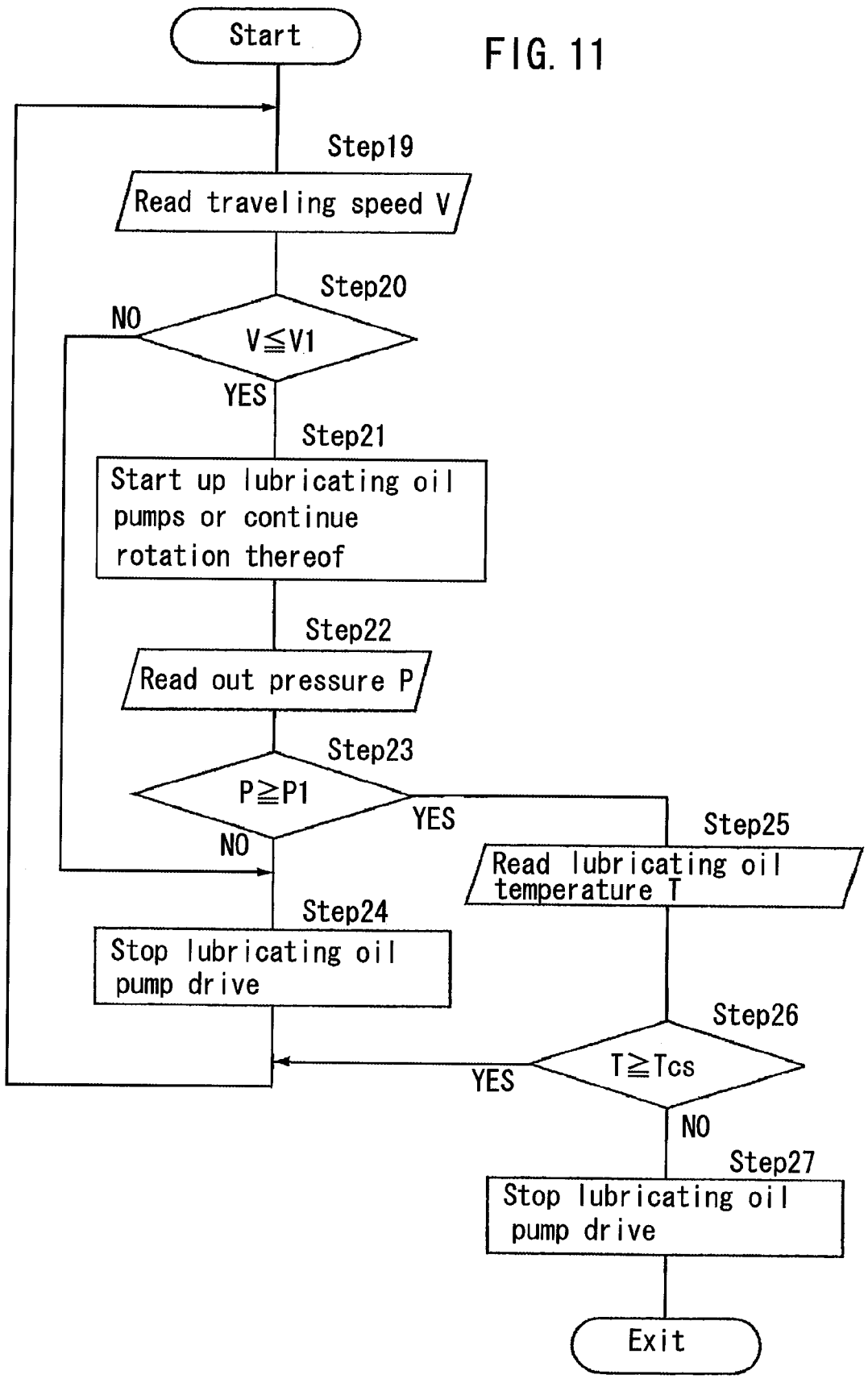
FIG. 11 presents a flowchart of the normal operation executed in the embodiment.

If it is decided in step 6 that T≧Tcs, the lubricating oil temperature is judged to have risen to a sufficiently high level at which the viscosity of the lubricating oil is low enough to allow the lubricating oil pumps 17 (drive motor 18) to operate at the rated rotation rate with a sufficient safety margin, and accordingly, the operation proceeds to the normal operation routine in step 10 (see FIG. 11). The rated frequency Z4 for normal operation may be, for instance, 90 Hz, as in the example presented in FIG. 12.

During normal operation, the speed V of the traveling motor 16 detected by each speed sensor 56 is read (step 19) and the speed comparison means 87 compares the speed V with the reference speed V1 set by the reference speed setting means 77 (step 20), as shown in the flowchart in FIG. 11. If V≦V1, the lubricating oil pumps 17 are judged to be operating without running the risk of air intake and accordingly, the normal operation control means 85 drives or continues to rotate the drive motor 18 with the rated rotation rate (e.g., 90 Hz) via the motor drive circuit 83, thereby cooling the lubricating oil by circulating it through the wheel mounting sleeves 32 and the circulation paths 58 (step 21).

If V>V1, it is deemed that the surface level of the lubricating oil 29 may drop to or below the intake port 59a with centrifugal force causing the lubricating oil 29 inside the wheel mounting sleeves 32 to move upward along the inner walls of the wheel mounting sleeves 32, as has be shown in reference to FIG. 5. Accordingly, the lubricating oil pumps 17 (drive motor 18) are stopped (step 24), and then the operation returns to step 19.

After starting up the drive motor 18 or sustaining the drive motor 18 in the rotating state in step 21, the output pressure P detected by the pressure sensors 64 is read (step 22) and the output pressure thus read is compared with the reference output pressure P1 (step 23). If P<P1, it is judged that air is being taken in and accordingly, the drive motor 18 is turned off (step 24). If P≧P1, the lubricating oil temperature T detected by the second temperature sensors 65 is read (step 25) and the lubricating oil temperature T is compared with the reference temperature Tcs (step 26). If T<Tcs, the lubricating oil is judged to have been cooled and accordingly, the drive motor 18 is turned off (step 27), before the operation returns to step 1 in FIG. 9. If T≧Tcs, however, the operation returns to step 19.

It is to be noted that in the embodiment described above, a set of sensors made up with a first temperature sensor 57, a second temperature sensor 65, a speed sensor 56 and a pressure sensor 64 is installed in correspondence to each of the left/right traveling motors 16 and 16 and also in correspondence to each of the lubricating oil pumps 17 and 17. However, a single drive motor 18 is installed to serve both lubricating oil pumps 17 and 17. The outputs from the two sets of sensors installed in correspondence to the left traveling motor and the right traveling motor may be processed so that the drive motor 18 is turned on or off or the speed is switched as the output from a sensor corresponding to either the left side traveling motor or the right side traveling motor or the outputs from the sensors corresponding to the left side traveling motor and the right side traveling motor reach the threshold value (reference temperature, reference speed, reference pressure) or fall below the threshold value. As an alternative to such sensor output processing, the drive motor 18 may be turned on or off or the speed thereof may be switched when the average value of the outputs from the sensors corresponding to the left side traveling motor and the right side traveling motor reaches the threshold value or falls below the threshold value. Furthermore, instead of processing the outputs from the various types of sensors in a uniform processing mode, the processing mode may be adjusted in correspondence to the sensor type. In addition, when the present invention is adopted in a structure that includes drive motors 18 each installed in correspondence to either the left-side lubricating oil pump 17 and the right-side lubricating oil pump 17, the outputs from the left side sensors and the outputs from the right side sensors should be utilized in the control of the corresponding drive motors 18.

In the embodiment described above, the second temperature sensors 65 that detect the lubricating oil temperature are installed outside the wheel mounting sleeves 32 and even when the lubricating oil temperature T detected by the second temperature sensors 65 is at a level that does not normally require cooling, the startup operation control means 82 in the vehicle controller 15 starts up the lubricating oil pumps 17. Namely, the drive motor 18 for the lubricating oil pumps 17 is engaged in operation at a low speed corresponding to the temperature of the lubricating temperature T detected by the second temperature sensors 65, which ultimately indicate the temperature of the lubricating oil circulating via the lubricating oil pumps 17, i.e., the lubricating oil viscosity (viscous resistance). As a result, the lubricating oil pumps 17 and the drive motor 18 can be engaged in operation without placing excessive loads on them, i.e., without running the risk of the lubricating oil pumps and the drive motor having to shut down. Consequently, even when the work vehicle needs to travel in a cold work environment where the viscosity of the lubricating oil is bound to be high, the lubricating oil inside the wheel mounting sleeves 32 can be drawn out of the wheel mounting sleeves 32 and the temperature of the lubricating oil having just been drawn out of the wheel mounting sleeves 32 can be promptly detected by the second temperature sensors 65.

In addition, the drive motor 18 for the lubricating oil pumps 17 is controlled so that its speed increases as the detected temperature rises, i.e., as the viscosity of the lubricating oil becomes lower. Thus, the drive motor 18 for the lubricating oil pumps 17 is operated under the optimal conditions with the speed of the drive motor 18 increased quickly so as to output a greater quantity of lubricating oil promptly, without placing an excessive load on the drive motor 18. In addition, since these measures also ensure that high-viscosity, high-pressure lubricating oil is not supplied to the oil coolers 68, damage to the oil coolers 68 is prevented.

Thus, the lubricating oil pumps 17 can be started up even in a cold work environment without requiring a large capacity drive motor 18 to drive the lubricating oil pumps 17. In addition, even in the event of a failure of either second temperature sensor 65, the second temperature sensor 65, disposed outside the wheel mounting sleeve 32, can be replaced easily and quickly without having to disengage the wheels or the traveling motor 16 from the wheel mounting sleeve 32. Namely, the operator is able to access the second temperature sensor 65 installed within the motor housing sleeve 22 through the inspection window at the motor housing sleeve 22 for replacement.

In addition, in the embodiment described above, as the lubricating oil pumps 17 are engaged in operation, the drive motor 18 for the lubricating oil pumps 17 is turned off if the output pressure detected by the pressure sensors 64 is less than the first reference pressure P1 at which an air intake may occur at the lubricating oil pumps 17. Thus, damage due to cavitation in the lubricating oil pumps 17 attributable to such an air intake can be prevented. Furthermore, if the output pressure detected by the pressure sensors 64 exceeds the cracking pressure P2 at which damage to the oil coolers 68 may occur, the output lubricating oil is made to flow back to the intake pipings 60 via the bypass valves 69, thereby ensuring that the oil coolers 68 are not subjected to any excessive lubricating oil output pressure and ultimately protecting the oil coolers from damage.

Figure 13:
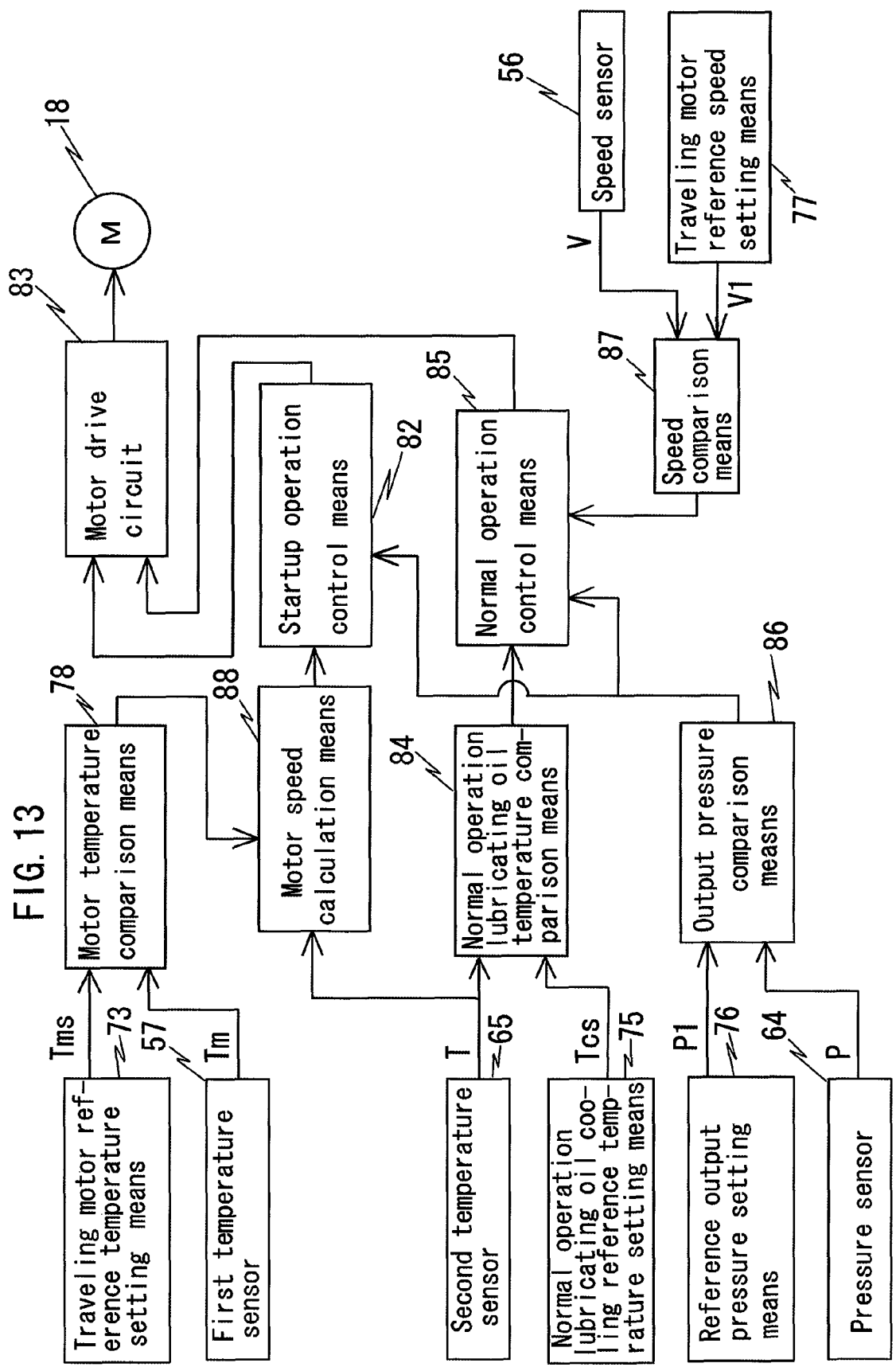
FIG. 13 is a function block diagram of the lubricating oil cooling device achieved in another embodiment of the present invention.
Figure 14:
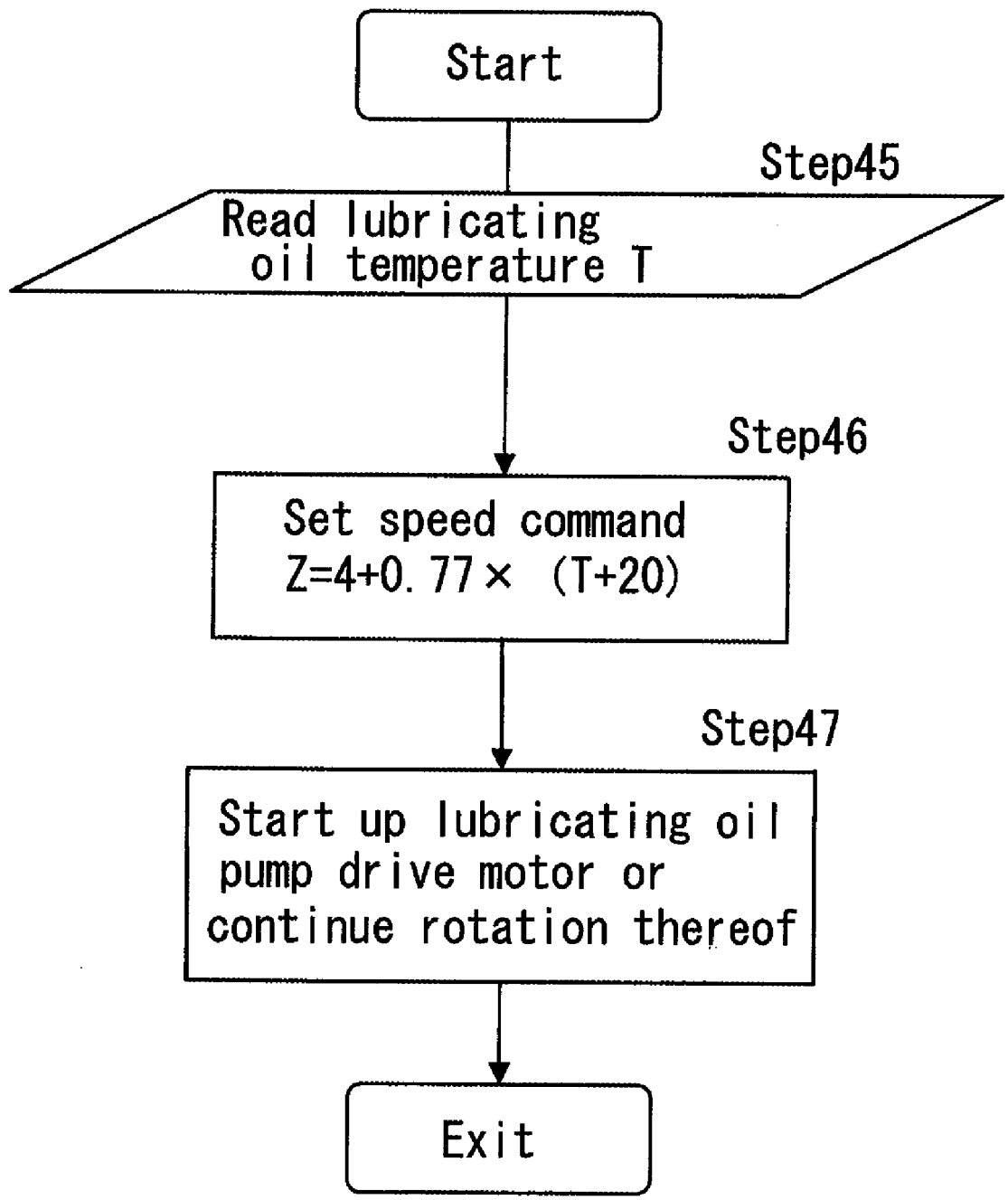
FIG. 14 presents a flowchart of the startup operation executed in the embodiment illustrated in FIG. 13.
Figure 15:
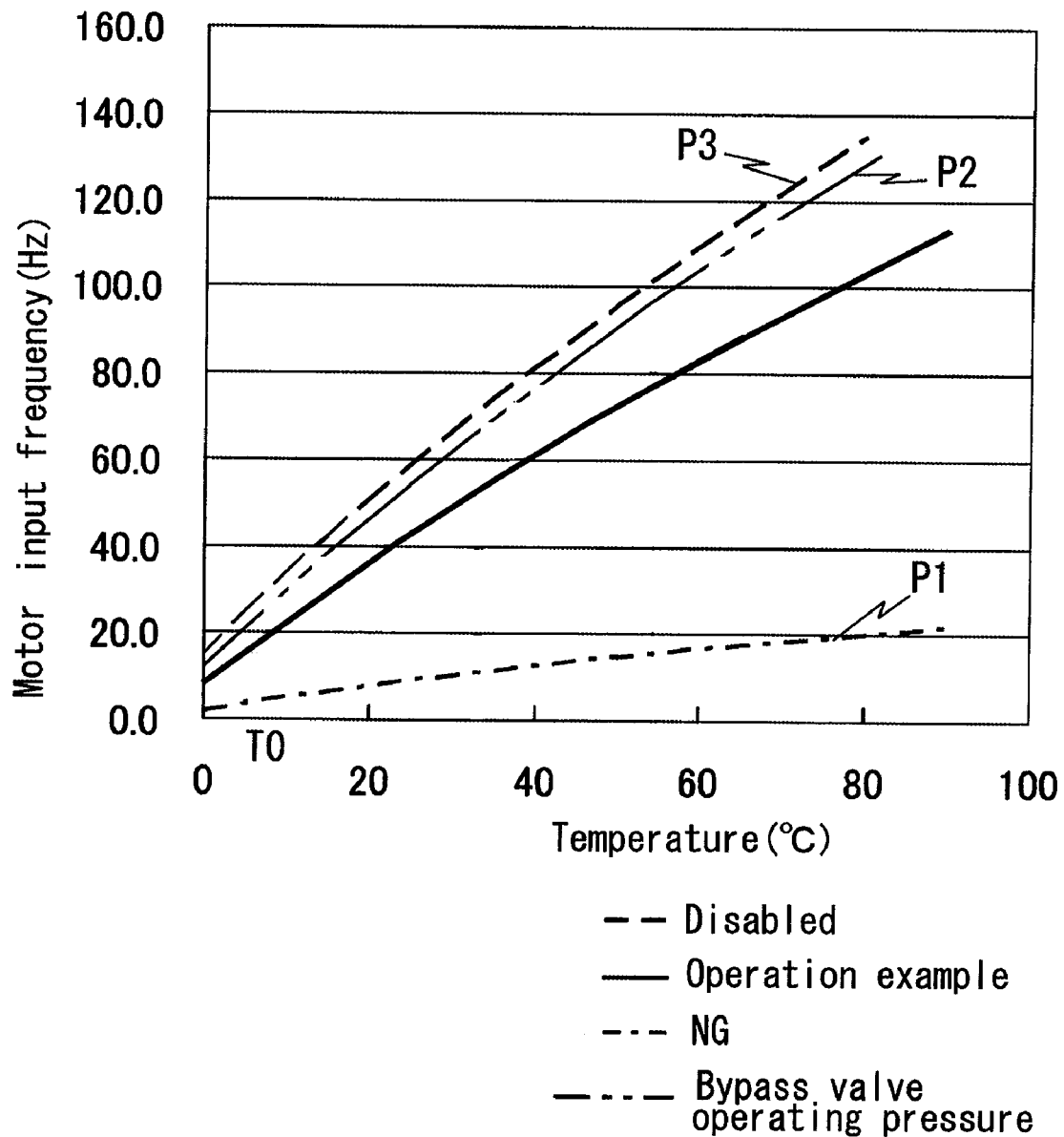
FIG. 15 presents an example of motor operation control that may be executed in the embodiment illustrated in FIG. 13.

FIG. 13 is a function block diagram related to another embodiment of the present invention. In addition, FIG. 14 presents a flowchart of an operation that is equivalent to the pump startup routine (step 3) in FIG. 9, which is executed in the embodiment. FIG. 15 presents a graph illustrating the relationship among the lubricating oil temperature, the lubricating oil pump drive motor speed and the lubricating oil pump output pressure (an example of motor operation control). While the rotation rate of the drive motor 18 is set in steps in the previous embodiment, a drive frequency Z for the drive motor 18 is determined through arithmetic operation executed by a motor speed calculation means 88 based upon the lubricating oil temperature T detected by the second temperature sensors 65 so as to control the drive motor 18 through continuously variable speed adjustment in the embodiment illustrated in FIGS. 13~15. Namely, as the temperature Tm of the traveling motor 16 becomes equal to or higher than the reference temperature Tms at an initial stage of the work vehicle traveling operation, the lubricating oil temperature T detected by each second temperature sensor 65 is read into the vehicle controller 15 (step 45) in the flowchart presented in FIG. 14. Then, based upon the temperature T, the motor speed calculation means 88 calculates the drive frequency Z for the drive motor 18 as expressed below (step 46). Subsequently, the startup operation control means 82 drives the drive motor 18 with the drive frequency Z having been determined through the arithmetic operation (step 47).

$$Z = a + b \times (T + c)$$

It is to be noted that a, b and c are respectively set to 4 (Hz), 0.77 and 20 (° C.) in the embodiment.

The expression presented above was obtained based upon a rule of thumb. In addition, none of the numerical values assumed for the constants a, b and c is determined univocally, but rather, optimal numerical values, selected in correspondence to the piping length, the pump capacities, the size of the drive motor 18 in the particular body, should be assumed for the constants. In addition, the frequency Z is adjusted so that the optimal output pressure, higher than the output pressure P1 at which air intake occurs and lower than the cracking pressure P2 at which cracking of the bypass valves 69 may occur, is achieved through the full lubricating oil temperature range. In the embodiment, if the temperature T detected by the second temperature sensors 65 is, for instance, −20° C., the drive frequency Z will be calculated to be 4 Hz, whereas Z will be calculated to be 15 Hz in correspondence to the temperature T at 0° C.

In the embodiment illustrated in FIGS. 13~15, the lubricating oil pumps 17 can be started up at the optimal speed corresponding to the temperature T detected by the second temperature sensors 65 and thus, the object of the present invention is achieved in an even more effective manner.

Figure 16:
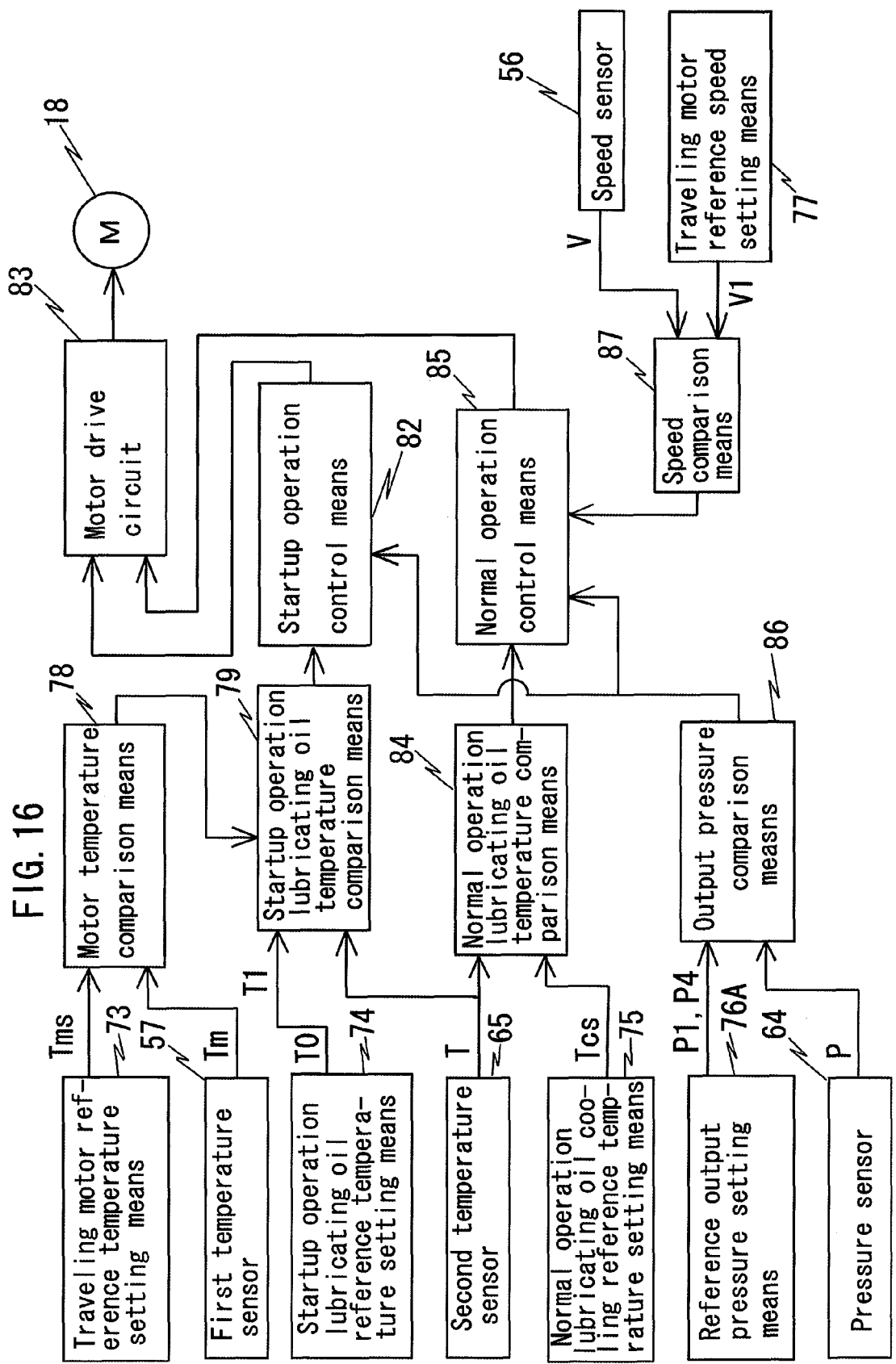
FIG. 16 is a function block diagram of the lubricating oil cooling device achieved in yet another embodiment of the present invention.
Figure 17:
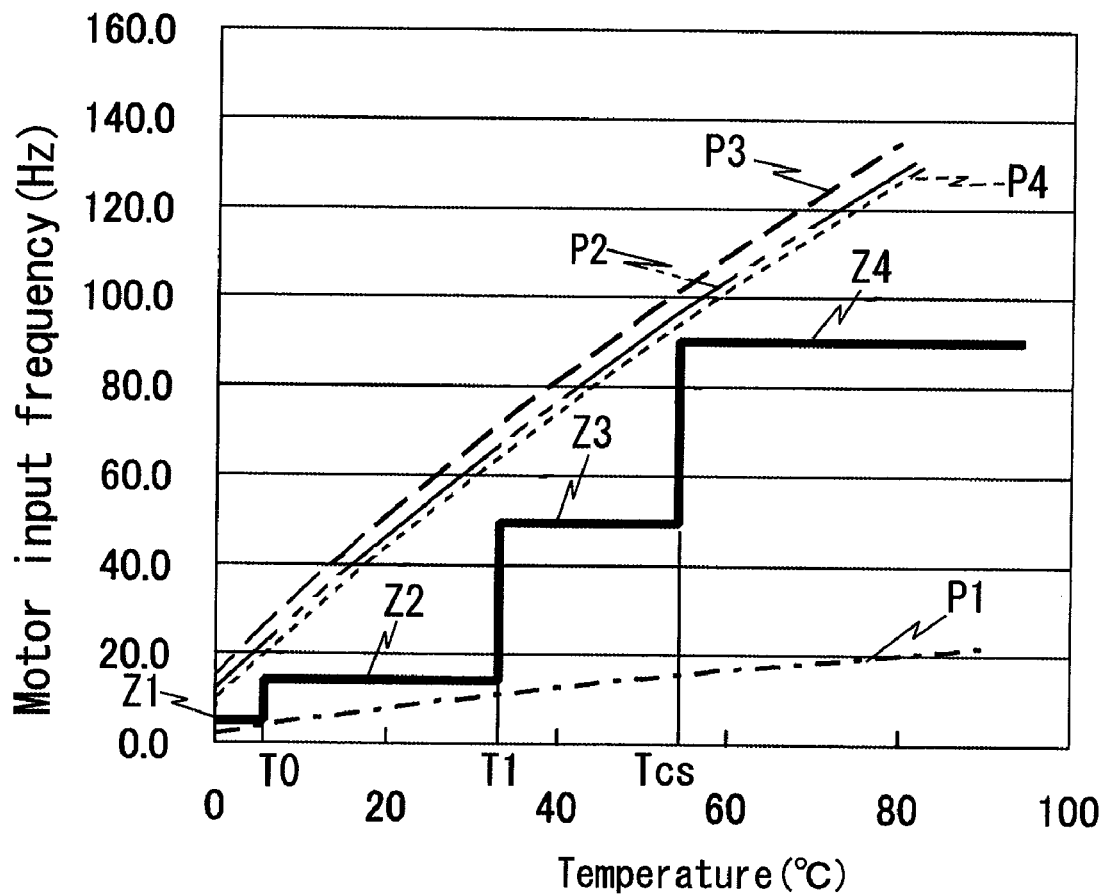
FIG. 17 presents an example of motor operation control that may be executed in the embodiment illustrated in FIG. 16.

FIGS. 16~19 respectively present a function block diagram of a further embodiment of the present invention, a diagram of motor operation control that may be executed in the embodiment and a flowchart of the operation executed in the embodiment. In this embodiment, a reference output pressure P4 (e.g., 0.40 MPa), slightly lower than the cracking pressure P2 (e.g., 0.47 MPa at which cracking of the bypass valves 69 may occur) is set as shown in FIG. 17. As shown in FIG. 16, during the startup operation (Tm<Tms) or the normal operation (Tm≧Tms), the output pressure comparison means 86 compares the detected output pressure P with the reference output pressure P1 used as a the air intake criterion but also compares the output pressure P with the reference output pressure P4 shown in FIG. 17. Once P becomes greater than P4, the startup operation control means 82 or the normal operation control means 85 temporarily turns off the drive motor 18.

Figure 18:
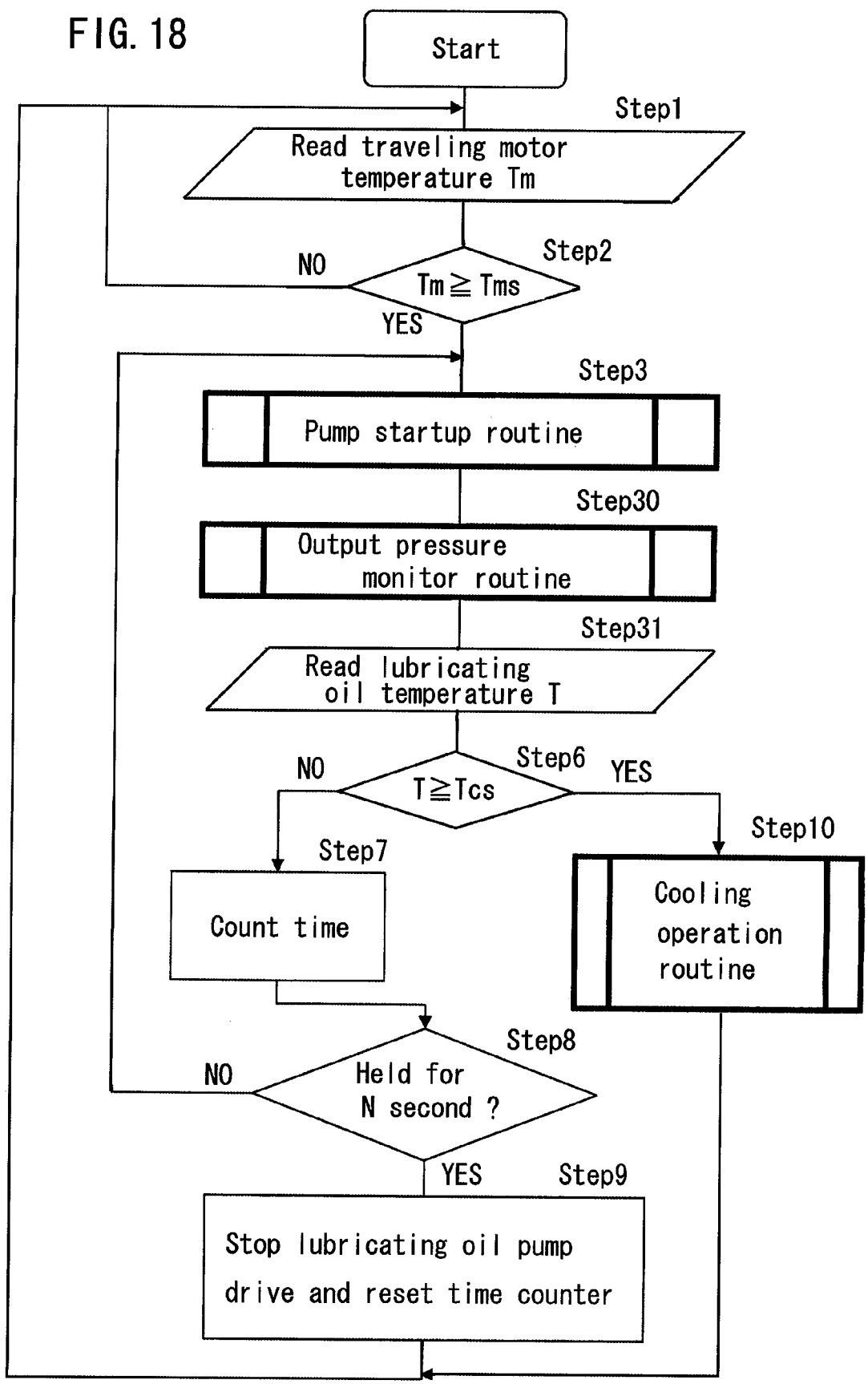
FIG. 18 presents a flowchart of the startup operation executed in the embodiment illustrated in FIG. 16.
Figure 19:
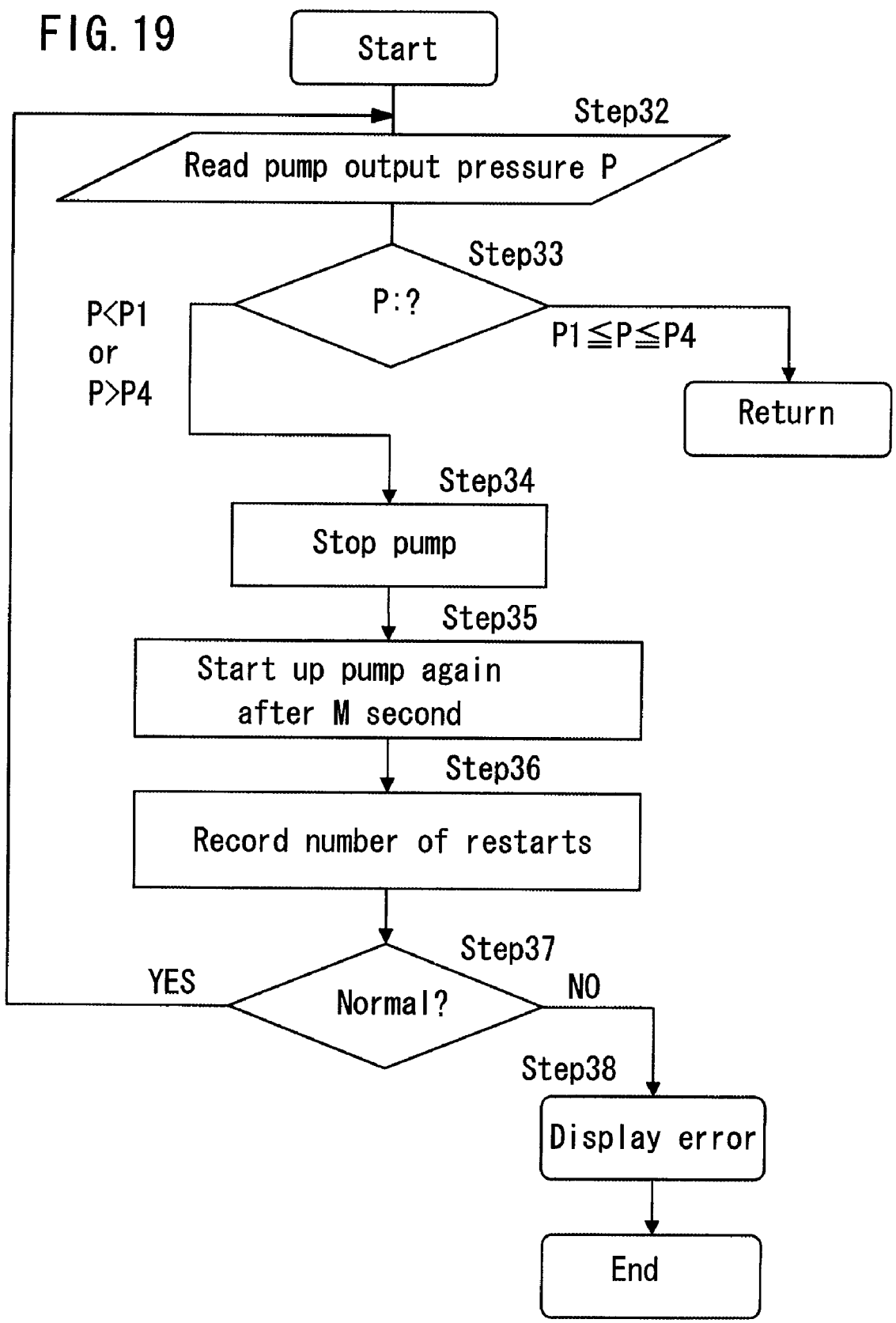
FIG. 19 presents a flowchart of the output pressure monitor processing executed in the embodiment illustrated in FIG. 16.

During the startup operation executed in the embodiment, the pump startup routine processing (step 3) in FIG. 9 is first executed and then the output pressure detected by each pressure sensor 64 is read (step 30) in output pressure monitor routine processing, as shown in FIG. 18. The output pressure monitor routine processing is executed as shown in FIG. 19. Namely, the output pressure P detected by the pressure sensors 64 is read (step 32) and the output pressure comparison means 86 compares the output pressure P with the reference output pressures P1 and P4 set by a reference output pressure setting means 76A (step 33). If P<P1 or P>P4, the startup operation control means 82 stops the drive motor 18 for M seconds (step 34). If P1≦P≦P4, the operation returns to the processing in FIG. 18 to execute the processing in step 31 and subsequent steps, as has been described in reference to FIG. 9.

Once M seconds have elapsed after the drive motor 18 enters the OFF state based upon the output pressure comparison results indicating P<P1 or P>P4, the drive motor 18 is started up again (step 35). The cumulative number of times that the drive motor has been restarted is counted and recorded (step 36), and if this cumulative number of times exceeds a predetermined value (the preferred range is 3~10), it is decided that an abnormal condition has manifested, an error message is brought up on display at the display unit 71 in FIG. 7 and the drive motor is turned off (step 37,38). If the cumulative number of times is smaller than the predetermined value, the operation returns to step 32. It is to be noted that the M-second period over which the drive motor 18 remains in the OFF state represents the length of time needed for the output pressure to fall to a low enough level (e.g., 0.15 MPa) at which the lubricating oil pumps 17 can resume their operation safely. M may be set to, for instance, 5~60 seconds. Similar control is executed during normal operation as well. It is to be noted that the reference output pressure P4 should be set substantially equal to (0.8~0.9)×P2. If the reference output pressure P4 is less than 0.8×P2, the drive motor 18 is bound to be turned off too frequently to destabilize the operation, whereas if the reference output pressure P4 is greater than 0.9×P2, the bypass valves 69 are likely to be engaged readily.

The following advantage is achieved by turning off the lubricating oil pumps 17 when the output pressure P reaches the pressure level P4, lower than the cracking pressure P2 at which cracking of the bypass valves 69 may occur, as described above. Namely, the bypass flow rate at the bypass valves 69 in FIG. 4 decreases as the lubricating oil temperature decreases. In other words, at a lower lubricating oil temperature, the output pressure can be lowered via the bypass valves 69 only to a lesser extent and the oil coolers 68 may be subjected to an output pressure exceeding the cracking pressure P2 even if the lubricating oil is bypassed through the bypass valves 69. Accordingly, the lubricating oil pumps 17 are stopped before the output pressure reaches the cracking pressure P2 in the embodiment so as to prevent damage to the oil coolers 68 and the like due to an excessive output pressure.

The embodiment achieves another advantage. Namely, as the bypass valves 69 open and the lubricating oil passes through the bypass valves 69, the lubricating oil temperature at the bypass valves rises. Thus, the output lubricating oil temperature detected by the second temperature sensors 65 will rise drastically. In such a case, the detection accuracy with which the second temperature sensors 65 detect the lubricating oil temperature will be compromised. This, in turn, may negate the primary object of the present invention, i.e., the optimal control of the speed of the drive motor 18 in correspondence to the lubricating oil temperature. In other words, the second temperature sensors 65 may detect a lubricating oil temperature higher than the actual lubricating oil temperature inside the wheel mounting sleeves 32, and in such a case, the drive motor 18 may be driven at a higher rate than the selected speed setting. By adopting the embodiment illustrated in FIGS. 16~19, such an undesirable phenomenon is prevented and the optimal control of the drive motor 18 is enabled.

Figure 20:
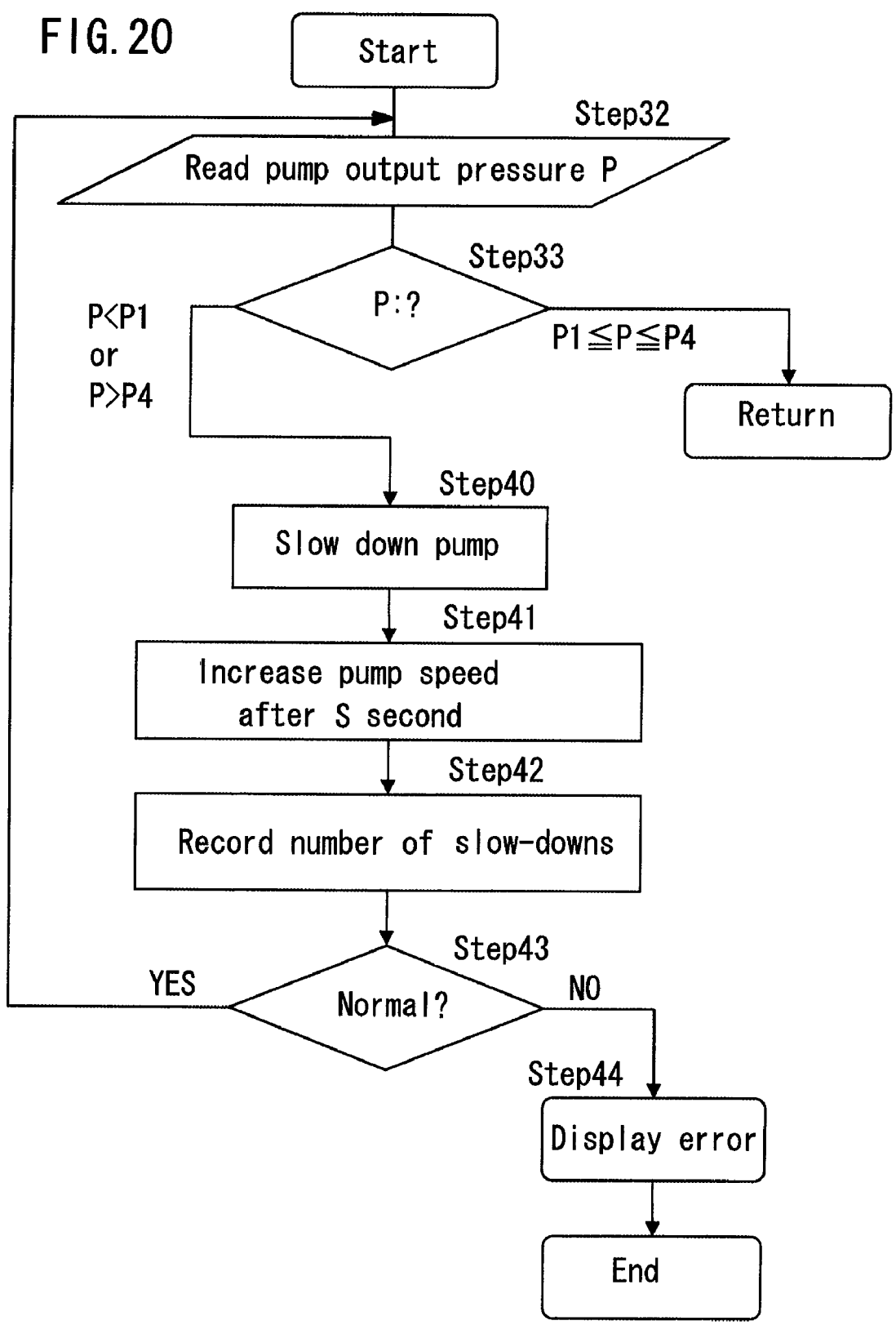
FIG. 20 presents a flowchart of the output pressure monitor processing executed in another embodiment of the present invention.

FIG. 20 presents a flowchart of the operation executed in yet another embodiment of the present invention. In the embodiment, when the output pressure P becomes less than the reference output pressure P1 or greater than the reference output pressure P4, the lubricating oil pumps are slowed down for S seconds and then the speed is increased subsequently (steps 40 and 41), instead of turning off the lubricating oil pumps 17. The speed should be slowed to 40~90% of the speed assumed before the output pressure P reaches the reference output pressure P4. In addition, the S-second slowdown period may last, for instance, 10~60 seconds. The processing in steps 42, 43 and 44 executed after increasing the speed in step 41, is executed as in the flowchart presented in FIG. 19.

The embodiment shown in FIG. 20 achieves an advantage similar to that of the embodiment illustrated in FIGS. 16~19 in that the reflux of lubricating oil via the bypass valves 69 is prevented or the quantity of lubricating oil flowing back through the bypass valves can be reduced, which ultimately prevents a rise in the lubricating oil temperature attributable to the reflux and enables the optimal control of the drive motor 18. In addition, in the embodiment shown in FIG. 20 in which the lubricating oil pumps 17 are continuously engaged in slowed operation without coming to a halt even when the output pressure P becomes equal to or greater than the reference output pressure P4, the lubricating oil in the wheel mounting sleeves 32 is continuously drawn out of the wheel mounting sleeves. Thus, since the lubricating oil pumps 17 are not held in the OFF state to result in a decrease in the lubricating oil temperature in the circulation paths 58, the speed of the drive motor 18 can be controlled in an even more effective manner.

It is to be noted that when comparing the output pressure P with the reference output pressure P4 as has been described in reference to FIGS. 19 and 20, the decrease (ΔP) in the output pressure occurring at the pressure holding valves 66 and the dust filters 67 must be factored in. Accordingly, it is desirable to compare the value obtained by subtracting the pressure decrease ΔP from the detected output pressure P with the reference output pressure P4 in practical applications. As an alternative, the detected output pressure P may be directly compared with a reference output pressure P4 assuming a value set by factoring in the output pressure decrease ΔP in advance. As a further alternative, the pressure at the bypass valve 69 in each output piping 61 may be directly detected and compared with the reference output pressure P4.

The invention claimed is:

1. A traveling speed reduction gear lubricating oil cooling device in a work vehicle, including:
    a tubular wheel mounting sleeve that rotates as one with wheels of said work vehicle;
    a traveling motor used to drive said wheel mounting sleeve;
    a reduction gear unit housed inside said wheel mounting sleeve and constituted with a gear mechanism that slows rotation of said traveling motor and transmits the slowed rotation to said wheel mounting sleeve; and
    a circulation path and a lubricating oil pump disposed outside said wheel mounting sleeve, via which reduction gear lubricating oil drawn out of said wheel mounting sleeve is cooled at an oil cooler and then made to travel back into said wheel mounting sleeve;
    characterized in that said traveling speed reduction gear lubricating oil cooling device comprises:
    a first temperature sensor that detects the temperature of said traveling motor;
    a second temperature sensor disposed in said circulation path outside said wheel mounting sleeve, which detects the temperature of the lubricating oil;
    a traveling motor reference temperature setting means for setting in advance a reference temperature for said traveling motor;
    a motor temperature comparison means for comparing the temperature detected by said first temperature sensor with said reference temperature set for said traveling motor; and
    a startup operation control means for increasing the rotation speed of a drive motor for the lubricating pump in correspondence to a rise in the temperature detected by said second temperature sensor within a speed range lower than a normal operating speed upon determining that the temperature detected by said first temperature sensor is equal to or higher than said reference temperature set for said traveling motor.

2. A traveling speed reduction gear lubricating oil cooling device according to claim 1, further comprising:
    a startup operation lubricating oil reference temperature setting means for setting a single startup operation lubricating oil reference temperature or a plurality of startup operation lubricating oil reference temperatures for startup operation, lower than a reference temperature at which said lubricating oil is cooled during normal operation; and
    a startup operation lubricating oil temperature comparison means for comparing the temperature detected by said second temperature sensor with a startup operation lubricating oil reference temperature, wherein:
    said startup operation control means increases the rotation speed of said drive motor for said lubricating oil pump in steps once the temperature detected by said second temperature sensor becomes equal to or higher than said startup operation lubricating oil reference temperature.

3. A traveling speed reduction gear lubricating oil cooling device according to claim 2, further comprising:
    a bypass valve constituted with a check valve installed in an outlet-side piping located on an outlet side of said lubricating oil pump via which oil having been output is redirected toward an intake side when said lubricating oil pump outputs said lubricating oil with an excessive pressure;
    a pressure sensor that detects said lubricating oil pressure at said outlet-side piping; and
    a reference output pressure setting means for setting a reference output pressure slightly lower than a cracking pressure at which said bypass valve cracks, wherein:
    said startup operation control means has a function of temporarily stopping said drive motor for said lubricating oil pump when the output pressure at said bypass valve in said outlet-side piping becomes equal to or greater than said reference output pressure.

4. A traveling speed reduction gear lubricating oil cooling device according to claim 2, further comprising:
    a bypass valve constituted with a check valve installed in an outlet-side piping located on an outlet side of said lubricating oil pump via which oil having been output is redirected toward an intake side when said lubricating oil pump outputs said lubricating oil with an excessive pressure;
    a pressure sensor that detects said lubricating oil pressure at said outlet-side piping; and
    a reference output pressure setting means for setting a reference output pressure slightly lower than a cracking pressure at which said bypass valve cracks, wherein:
    said startup operation control means has a function of temporarily slowing said drive motor for said lubricating oil pump when the output pressure at said bypass valve in said outlet-side piping becomes equal to or greater than said reference output pressure.

5. A traveling speed reduction gear lubricating oil cooling device according to claim 1, further comprising:
    a motor speed calculation means for calculating through arithmetic operation a speed of said drive motor for said lubricating oil pump in correspondence to the temperature detected by said second temperature sensor, wherein:
    said startup operation control means increases the rotation speed of said drive motor for said lubricating oil pump in correspondence to a rise in the temperature detected by said second temperature sensor based upon calculation results provided by said motor speed calculation means.

6. A traveling speed reduction gear lubricating oil cooling device according to claim 5, further comprising:
    a bypass valve constituted with a check valve installed in an outlet-side piping located on an outlet side of said lubricating oil pump via which oil having been output is redirected toward an intake side when said lubricating oil pump outputs said lubricating oil with an excessive pressure;
    a pressure sensor that detects said lubricating oil pressure at said outlet-side piping; and
    a reference output pressure setting means for setting a reference output pressure slightly lower than a cracking pressure at which said bypass valve cracks, wherein:
    said startup operation control means has a function of temporarily stopping said drive motor for said lubricating oil pump when the output pressure at said bypass valve in said outlet-side piping becomes equal to or greater than said reference output pressure.

7. A traveling speed reduction gear lubricating oil cooling device according to claim 5, further comprising:
    a bypass valve constituted with a check valve installed in an outlet-side piping located on an outlet side of said lubricating oil pump via which oil having been output is redirected toward an intake side when said lubricating oil pump outputs said lubricating oil with an excessive pressure;

a pressure sensor that detects said lubricating oil pressure at said outlet-side piping; and a reference output pressure setting means for setting a reference output pressure slightly lower than a cracking pressure at which said bypass valve cracks, wherein:

said startup operation control means has a function of temporarily slowing said drive motor for said lubricating oil pump when the output pressure at said bypass valve in said outlet-side piping becomes equal to or greater than said reference output pressure.

8. A traveling speed reduction gear lubricating oil cooling device according to claim 1, further comprising:

a bypass valve constituted with a check valve installed in an outlet-side piping located on an outlet side of said lubricating oil pump via which oil having been output is redirected toward an intake side when said lubricating oil pump outputs said lubricating oil with an excessive pressure;

a pressure sensor that detects said lubricating oil pressure at said outlet-side piping; and a reference output pressure setting means for setting a reference output pressure slightly lower than a cracking pressure at which said bypass valve cracks, wherein:

said startup operation control means has a function of temporarily stopping said drive motor for said lubricating oil pump when the output pressure at said bypass valve in said outlet-side piping becomes equal to or greater than said reference output pressure.

9. A traveling speed reduction gear lubricating oil cooling device according to claim 1, further comprising:

a bypass valve constituted with a check valve installed in an outlet-side piping located on an outlet side of said lubricating oil pump via which oil having been output is redirected toward an intake side when said lubricating oil pump outputs said lubricating oil with an excessive pressure;

a pressure sensor that detects said lubricating oil pressure at said outlet-side piping; and a reference output pressure setting means for setting a reference output pressure slightly lower than a cracking pressure at which said bypass valve cracks, wherein:

said startup operation control means has a function of temporarily slowing said drive motor for said lubricating oil pump when the output pressure at said bypass valve in said outlet-side piping becomes equal to or greater than said reference output pressure.

\* \* \* \* \*